United States Patent

Snelson et al.

(10) Patent No.: US 9,537,166 B2
(45) Date of Patent: Jan. 3, 2017

(54) METHOD FOR THE PRODUCTION OF AN ELECTROCHEMICAL CELL

(75) Inventors: Todd Snelson, Oneonta, NY (US); Raymond Puffer, Watervliet, NY (US); Daniel Walczyk, Troy, NY (US); Jake Pyzza, Campbell Hill, NY (US); Lakshmi Krishnan, Clifton Park, NY (US)

(73) Assignee: Rensselaer Polytechnic Institute, Troy, NY (US)

( * ) Notice: Subject to any disclaimer, the term of this patent is extended or adjusted under 35 U.S.C. 154(b) by 990 days.

(21) Appl. No.: 13/702,766

(22) PCT Filed: Jun. 8, 2011

(86) PCT No.: PCT/IB2011/001269
§ 371 (c)(1),
(2), (4) Date: Apr. 24, 2013

(87) PCT Pub. No.: WO2011/154811
PCT Pub. Date: Dec. 15, 2011

(65) Prior Publication Data
US 2013/0202984 A1    Aug. 8, 2013

Related U.S. Application Data

(60) Provisional application No. 61/397,192, filed on Jun. 8, 2010.

(51) Int. Cl.
*H01M 4/88* (2006.01)
*H01M 8/10* (2016.01)
(Continued)

(52) U.S. Cl.
CPC .............. *H01M 8/1002* (2013.01); *C25B 9/10* (2013.01); *H01M 4/881* (2013.01);
(Continued)

(58) Field of Classification Search
None
See application file for complete search history.

(56) References Cited

U.S. PATENT DOCUMENTS 5,464,488 A * 11/1995 Servin ................... B29C 66/032
156/157
5,464,700 A    11/1995 Steck et al.
(Continued)

FOREIGN PATENT DOCUMENTS

DE    195 09 748 A1    10/1996
DE    195 09 749 A1    10/1996
(Continued)

OTHER PUBLICATIONS

English Translation of International Preliminary report on Patentability (IPRP) for PCT/IB2011/001269 dated Dec. 10, 2012.
(Continued)

*Primary Examiner* — Jonathan Crepeau

(57) ABSTRACT

The present invention relates to a new method for the production of electrochemical cells, in particular individual cells for fuel cells and stacks, in which the individual components of a membrane electrode assembly are compressed and bonded by use of ultrasonic waves and the absence of any further additional heating. The method according to the invention allows faster cycles during the lamination of the membrane electrode assemblies.

28 Claims, 2 Drawing Sheets

(51) Int. Cl.
    *C25B 9/10*    (2006.01)
    *H01M 8/02*   (2016.01)
(52) U.S. Cl.
    CPC ....... *H01M 4/8807* (2013.01); *H01M 4/8896* (2013.01); *H01M 8/0273* (2013.01); *H01M 8/0297* (2013.01); *H01M 8/1004* (2013.01); *H01M 8/103* (2013.01); *H01M 2300/0082* (2013.01); *Y02E 60/521* (2013.01); *Y02P 70/56* (2015.11); *Y10T 156/10* (2015.01)

(56) References Cited

U.S. PATENT DOCUMENTS

| | | |
|---|---|---|
| 5,738,905 A | 4/1998 | Bevers |
| 5,761,793 A | 6/1998 | Bevers et al. |
| 5,775,055 A * | 7/1998 | Giacomelli ............ B29C 65/08 156/580.1 |
| 5,928,807 A | 7/1999 | Elias |
| 5,998,057 A | 12/1999 | Koschany et al. |
| 2004/0096734 A1 | 5/2004 | Calundann et al. |
| 2004/0131909 A1 | 7/2004 | Soczka-Guth et al. |
| 2004/0170883 A1 | 9/2004 | Bartholomeyzik et al. |
| 2006/0014065 A1 | 1/2006 | Pawlik et al. |
| 2006/0105221 A1 | 5/2006 | Scherer et al. |
| 2008/0038613 A1* | 2/2008 | Padberg ................ C08J 5/2256 29/831 |
| 2010/0291462 A1 | 11/2010 | Thate et al. |

FOREIGN PATENT DOCUMENTS

| | | |
|---|---|---|
| DE | 19705468 A1 | 8/1998 |
| DE | 197 57 492 A1 | 7/1999 |
| DE | 102005046461 A1 | 4/2006 |
| DE | 102005038612 A | 2/2007 |
| EP | 0774794 A1 | 5/1997 |
| EP | 1296394 A1 | 3/2003 |
| EP | 1437780 A2 | 7/2004 |
| EP | 1612877 A2 | 1/2006 |
| EP | 2124276 A1 | 11/2009 |
| JP | 2001-196082 A | 7/2001 |
| JP | 2006278073 A | 10/2006 |
| WO | WO-92/15121 A1 | 9/1992 |
| WO | WO-96/13872 A1 | 5/1996 |
| WO | WO-9720358 A1 | 6/1997 |
| WO | WO-00/26982 A2 | 5/2000 |
| WO | WO-01/18894 A2 | 3/2001 |
| WO | WO-02/36249 A1 | 5/2002 |
| WO | WO-2007084109 A2 | 7/2007 |

OTHER PUBLICATIONS

International Search Report for PCT/IB2011/001269 mailed Oct. 18, 2011.

* cited by examiner

METHOD FOR THE PRODUCTION OF AN ELECTROCHEMICAL CELL

RELATED APPLICATIONS

This application is a national stage application (under 35 U.S.C. §371) of PCT/IB2011/001269, filed Jun. 8, 2011, which claims benefit of U.S. Provisional Application No. 61/397,192, filed Jun. 8, 2010. Both are incorporated herein by reference in their entirety.

The present invention relates to a new method for the production of electrochemical cells, in particular for electrolysers, and individual cells for fuel cells and stacks as well as devices for manufacturing such components and goods.

Electrochemical cells, in particular fuel cells have been known for a long time and represent an environmentally friendly source of electric energy and heat. Although the development of fuel cells is already well advanced and first prototypes and small series are available on the market, the production of fuel cells, in particular of individual cells for fuel cells and stacks still poses a big challenge. The currently chosen production methods are suitable for the commercial launch, but yet to be improved for large-scale production, in particular to achieve the cost objectives aimed for. Due to the complex multi-parameter system of fuel cells, the required components and their production have to be precisely aligned.

Nowadays sulphonic acid-modified polymers are widely used as proton-conducting membranes in polymer electrolyte membrane (PEM) fuel cells. Here, predominantly perfluorinated polymers are used, such as Nafion® from DuPont de Nemours, Willmington, USA which is a prominent example for these polymers. For the conduction of protons, relatively high water content is required in the membrane, which typically amounts to 4-20 molecules of water per sulphonic acid group. The required water content, but also the stability of the polymer in connection with acidic water and the reaction gases hydrogen and oxygen restricts the operating temperature of the PEM fuel cell stacks to below 80° C. Higher upper operating limits are possible for Nafion® based fuel cells, however, such higher temperatures require pressurization of gases. Further, higher operating temperatures cannot be implemented without a decrease in performance of the fuel cell. At temperatures higher than the dew point of water for a given pressure level, the membrane dries out completely and the fuel cell provides no more electric energy as the resistance of the membrane increases to such high values that an appreciable current flow no longer occurs.

If the polymer electrolyte membrane at the same time contains the catalyst or electrode, respectively, one speaks of a membrane electrode assembly (MEA). A MEA based on the technology set forth above is described, for example, in U.S. Pat. No. 5,464,700.

Due to system-specific reasons, however, operating temperatures in the fuel cell of more than 100° C. are desirable. The activity of the catalysts based on noble metals and contained in the membrane electrode assembly (MEA) is significantly improved at high operating temperatures.

Especially when the so-called reformates from hydrocarbons are used, the reformer gas contains considerable amounts of carbon monoxide which usually have to be removed by means of an elaborate gas conditioning or gas purification process. The tolerance of the catalysts to the CO impurities is increased at high operating temperatures.

Furthermore, heat is produced during operation of fuel cells. However, the cooling of these systems to less than 80° C., e.g. for Nafion® based systems, can be very complex. Depending on the power output, the cooling devices can be constructed significantly less complex. This means that the waste heat in fuel cell systems that are operated at temperatures of more than 100° C. can be utilized distinctly better and therefore the efficiency of the fuel cell system can be increased.

To achieve these temperatures, in general, membranes with new conductivity mechanisms are used. One approach to this end is the use of membranes which show ionic conductivity without employing water. The first promising development in this direction is set forth in the document WO96/13872.

Further high-temperature fuel cells are disclosed in JP-A-2001-196082 and US2006/014065 in which the sealing systems of the electrode membrane assembly are specifically examined.

Typically, the membrane electrode assembly (MEA) has a thickness of 10 to 1500, preferably 10 to 1000 μm. The membrane and even the MEA are extremely floppy and therefore provide handling problems during assembly. In order to overcome these problems, they are usually embedded into frames which moreover are provided with positioning tools. To produce an individual cell for fuel cells or a stack, the membrane electrode assemblies mentioned above are generally connected with planar bipolar plates which include ducts for a gas stream which were milled, moulded or embossed into the plates, the channels of the flow field.

Bipolar plates with integrated channels of the flow field for the production of individual cells for fuel cells or stacks have already been known for a long time. However, when installing the bipolar plates, it is important to provide sufficient gas/media leak tightness. To this end, the bipolar plates are sealed by means of gaskets towards the back of the gas diffusion layer (GDL) or gas diffusion electrode (GDE) (cf. DE 10 2005 046461) in some cases referred to as a special frame (cf. EP-A-1437780).

Another approach to seal the bipolar plate towards the gas diffusion layer or gas diffusion electrode is to already design parts of the bipolar plate in the construction process as gaskets (cf. EP-A-1612877 and EP-A-0774794) or to design the gasket as an integral part of the gas diffusion layer. Such a solution is described in EP-A-1296394. In the process, liquid sealing material penetrates the boundary area of the gas diffusion layer and solidifies in a subsequent step.

The aforementioned gasket or special frame, respectively, besides providing for sealing between the bipolar plate and the MEA also locally increases the thickness in the surroundings of the GDL/GDE. Often, relatively hard materials such as PTFE are used for this purpose. In order to improve their sealing behaviour, an additional elastic gasket can be provided on this gasket or frame, respectively. In the subsequent production of the individual cell for fuel cells or the stack, the arrays are screwed together and thus sealed.

According to the state of the art, membrane electrode assembly for such fuel cells are produced by compressing a sandwich-like structure made of two planar electrodes and a planar membrane arranged between the two electrodes up to a presettable pressure, preferably at a high temperature. Between the electrode and the membrane an annular gasket can be arranged that seals against the environment but at the same time does not prevent a contact between the electrode and the membrane. Such a sandwich-like unit is then placed between two pressure plates relatively movable in opposite directions, which are then compressed up to a presettable peak pressure and thus form an adhesive compound of the unit. While doing so, a protective layer can be inserted between the pressure plates and the membrane electrode unit.

When using electrodes that are produced on the basis of carbon fibre tissues under controlled pressure, however, the tissue structure (fibre prominences and valleys) of the electrode shows on to the membrane after compressing the membrane electrode assembly. Therefore, it may occur that the fibre prominences of the electrode are superimposed on both sides of the membrane during the production of the membrane electrode assembly. The pressure within this area can thereby rise locally significantly, which again leads to crushing or shearing whereby the membrane is damaged. Thus, short circuits may emerge between the electrodes and an unwanted and harmful gas exchange through the membrane can take place. This again leads to a reduced performance and a shortened lifetime of the fuel cells. Moreover, during the installation of thus predamaged membranes in a stack the risk of crushing and shearing by a further compression in the insertion process is additionally increased.

The thickness of the MEAs is set more or less uncontrolled with the use of tissue or paper as electrode material. That means, that a product series with an acceptable thickness variance is hard to produce in an economically reasonable manner.

It has been found that these production methods lead to problems, in particular when compressing the bipolar plate and/or the finished membrane electrode assembly. Due to the different compressibilities of the materials or different tolerances, leaks are noted which even by means of a combination of a hard gasket (special frame) and a resilient gasket cannot be compensated. Additionally, a production process in accordance with the above-mentioned principle includes the handling of many geometrical layers and their positioning in respect to each other. To this end, so-called positioning tools or adjusting tools are used as supporting measures which make the production process more complex—and thus more expensive. The main reason for this is that membrane and GDL/GDE have to be tailored larger than actually necessary with respect to their function because of positioning tolerances during assembly. Moreover, if an additional resilient gasket as described above is used, this constitutes an additional expense.

A different method for the manufacture of membrane electrode assemblies is provided in US 2008/0038613 by compressing a sandwich-like structure made of two planar electrodes and a planar membrane arranged between the two electrodes up to a presettable compression, preferably at a high temperature. This method provides more consistent goods. However, the methods still requires large investments into presses and software for operating such presses and the capacities using such pathway are limited, because of the heating and cooling times required in each cycle.

The task of the invention was therefore to provide a method which is at least partially not showing these disadvantages.

It was now found that the above problems can be avoided when the production is not only performed by means of compressing the sandwich-like structure made of two planar electrodes and a planar membrane arranged between the two electrodes up to a presettable pressure/presettable compression and additionally such compression is performed using ultrasonic waves.

Ultrasonic welding, as such, is known since the late 1960's. However, such techniques cause melting the respective materials, such as thermoplastic polymers, under the influence of the ultrasonic waves. However, the materials used as polymer electrolyte membranes are often not capable to melt or even being damaged when melted.

Surprisingly, the instant inventors found that the production of membrane electrode assemblies can be performed by means of compressing the sandwich-like structure made of two planar electrodes and a planar membrane arranged between the two electrodes up to a presettable pressure or up to a presettable compression and additionally using ultrasonic waves for bonding the membrane to the two electrodes.

The instant invention provides a production process which can be designed much simpler and provides much higher capacities due to the shortened cycle times being involved.

Accordingly, an object of the present invention is a method for the production of an individual electrochemical cell, in particular an individual membrane electrode assembly for fuel cells, including (i) at least one proton-conducting polymer electrolyte membrane or electrolyte matrix,
(ii) at least one electrically conductive gas diffusion layer on each side of the proton-conducting polymer electrolyte membrane or electrolyte matrix,
(iii) at least one catalyst layer which in each case is arranged (a) on both sides of the proton-conducting polymer electrolyte membrane or electrolyte matrix or (b) on each side of the electrically conductive gas diffusion layers facing towards the proton-conducting polymer electrolyte membrane or electrolyte matrix or,
(iv) optionally a first subgasket film frame which overlaps (a) the outer peripheral area of the electrically conductive gas diffusion layer and (b) the outer peripheral area of the proton-conducting polymer electrolyte membrane or electrolyte matrix on the anode side and a second subgasket film frame which overlaps (a) the outer peripheral area of the electrically conductive gas diffusion layer and (b) the outer peripheral area of the proton-conducting polymer electrolyte membrane or electrolyte matrix on the cathode side, said first subgasket film and said second subgasket film extending beyond the proton-conducting polymer electrolyte membrane/electrolyte matrix (1) and beyond the electrically conductive gas diffusion layers, said first subgasket film and said second subgasket film further being in flat contact with each other, comprising the following steps:
a) supplying and depositing:
  (i) a gas diffusion layer or
  (ii) a gas diffusion layer which has at least one catalyst layer on that side facing upwards
  and depositing the gas diffusion layer on an anvil,
b) supplying and depositing:
  (i) a proton-conducting polymer electrolyte membrane or electrolyte matrix on the surface of the gas diffusion layer having a catalyst layer facing upwardly or
  (ii) a catalyst coated proton-conducting polymer electrolyte membrane or electrolyte matrix on the surface of the gas diffusion layer, the catalyst coated side of the membrane or matrix facing towards the gas diffusion layer,
c) supplying and depositing:
  (i) a gas diffusion layer in case the proton-conducting polymer electrolyte membrane/electrolyte matrix is catalyst coated or
  (ii) a gas diffusion layer which has at least one catalyst layer on that side facing towards the proton-conducting polymer electrolyte membrane/electrolyte matrix, d) compressing the components obtained in accordance with step a), b) and c) up to a presettable pressure or up to a presettable compression, characterized in that additionally ultrasonic waves are used for bonding the proton-conducting polymer electrolyte membrane/electrolyte matrix to the gas diffusion layers during the compression in step d).

In a preferred embodiment of the invention, the compression in step d) is supported by using ultrasonic waves only. Hence, no additional heating is performed in step d). The ultrasonic waves can be applied during the compression or subsequently thereafter while the compressed components are still in the press.

In a preferred embodiment of the invention, the gas diffusion layers, either coated with catalyst or not, the proton-conducting polymer electrolyte membrane/electrolyte matrix, either coated with catalyst or not, can be supplied as a part pre-cut from rolled goods or already completely pre-trimmed.

The first and second subgasket films, which are optional, are provided between step a) and step b) for the first subgasket and between step b) and step c) for the second gasket.

In an alternative embodiment of the invention, the assembling described in steps a) to c) can be performed separately, and hence the non-laminated sandwiched structures will be placed on the anvil for compression and bonding in step d).

Proton-Conducting Polymer Electrolyte Membranes and Matrices

Figure 1:
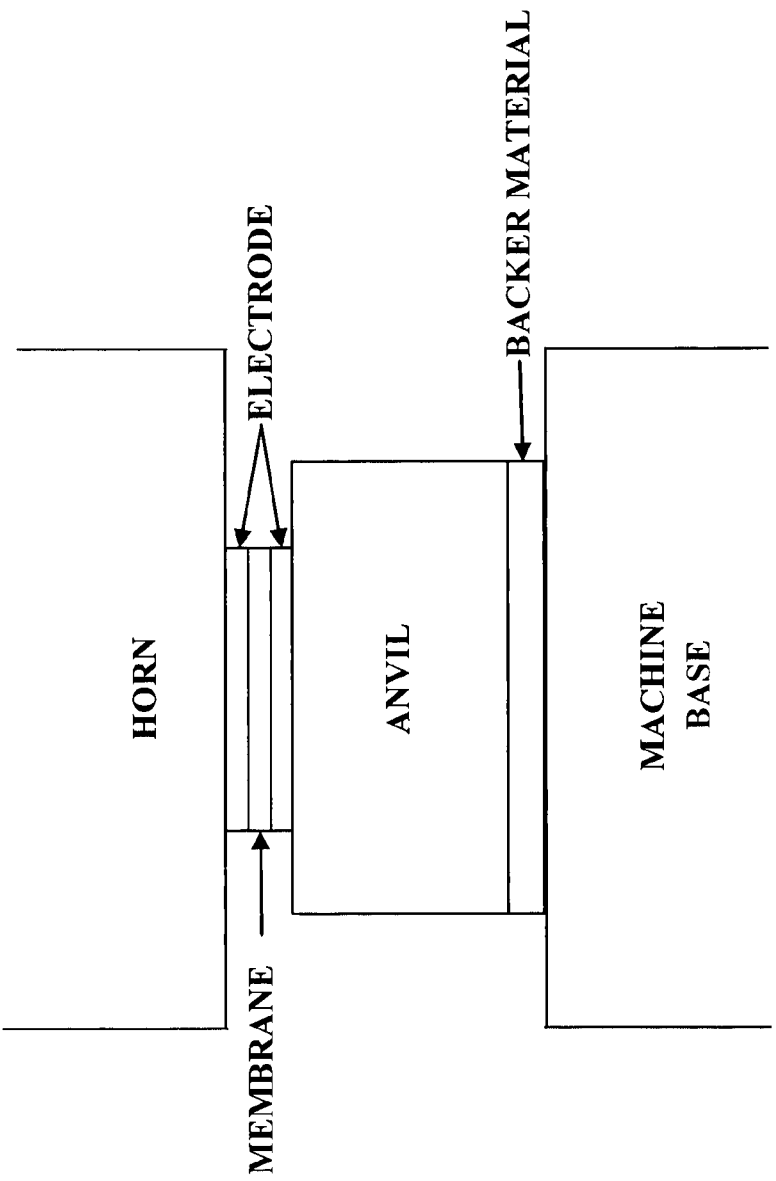
FIG. 1 shows the ultrasonic tooling used in connection with the method of the invention and the MEA materials used for compressing and bonding.

Polymer electrolyte membranes and electrolyte matrices, respectively, suited for the purposes of the present invention are known per se.

In addition to the known polymer electrolyte membranes, electrolyte matrices are also suitable. Within the context of the present invention, the term "electrolyte matrices" is understood to mean—besides polymer electrolyte matrices—also other matrix materials in which an ion-conducting material or mixture is fixed or immobilized in a matrix. As an example, mention shall be made here of a matrix made of SiC and phosphoric acid.

In general, polymer electrolyte membranes comprising acids are used wherein the acids may be covalently bound to the polymers, such as fluorinated or perfluorinated polymers having covalently bonded sulphonic and/or phosphonic acid groups. These kinds of materials are commercially available from DuPont de Nemours under the trade name Nafion®. Further materials are available from Asahi Glass from Japan.

Furthermore, a flat material may be doped with an acid in order to form a suitable membrane. These doped membranes can, amongst other methods, be produced by swelling flat materials, for example a polymer film, with a fluid comprising acidic compounds, or by manufacturing a mixture of polymers and acidic compounds and subsequently forming a membrane by forming a flat structure and subsequent solidification in order to form a membrane. These polymer electrolyte membranes comprise at least one acid which is not covalently bound to the polymer.

Polymers suitable for this purpose include, amongst others, polyolefins, such as poly(chloroprene), polyacetylene, polyphenylene, poly(p-xylylene), polyarylmethylene, polystyrene, polymethylstyrene, polyvinyl alcohol, polyvinyl acetate, polyvinyl ether, polyvinyl amine, poly(N-vinyl acetamide), polyvinyl imidazole, polyvinyl carbazole, polyvinyl pyrrolidone, polyvinyl pyridine, polyvinyl chloride, polyvinylidene chloride, polytetrafluoroethylene, polyhexafluoropropylene, copolymers of PTFE with hexafluoropropylene, with perfluoropropylvinyl ether, with trifluoronitrosomethane, with carbalkoxyperfluoroalkoxyvinyl ether, polychlorotrifluoroethylene, polyvinyl fluoride, polyvinylidene fluoride, polyacrolein, polyacrylamide, polyacrylonitrile, polycyanoacrylates, polymethacrylimide, cycloolefinic copolymers, in particular of norbornenes;

polymers having C—O bonds in the backbone, for example polyacetal, polyoxymethylene, polyether, polypropylene oxide, polyepichlorohydrin, polytetrahydrofuran, polyphenylene oxide, polyether ketone, polyester, in particular polyhydroxyacetic acid, polyethyleneterephthalate, polybutyleneterephthalate, polyhydroxybenzoate, polyhydroxypropionic acid, polypivalolacton, polycaprolacton, polymalonic acid, polycarbonate; polymeric C—S-bonds in the backbone, for example polysulphide ether, polyphenylenesulphide, polysulphones, polyethersulphone; polymeric C—N bonds in the backbone, for example polyimines, polyisocyanides, polyetherimine, polyetherimides, polyaniline, polyaramides, polyamides, polyhydrazides, polyurethanes, polyimides, polyazoles, polyazole ether ketone, polyazines;

liquid crystalline polymers, in particular Vectra, as well as inorganic polymers, for example polysilanes, polycarbosilanes, polysiloxanes, polysilicic acid, polysilicates, silicones, polyphosphazenes and polythiazyl.

In this connection, alkaline polymers are preferred wherein this particularly applies to membranes doped with acids. Almost all known polymer membranes in which protons can be transported come into consideration as alkaline polymer membranes doped with acid. Here, acids are preferred which are able to transport protons without additional water, for example by means of the so-called "Grotthus mechanism".

As alkaline polymer within the context of the present invention, preferably an alkaline polymer with at least one nitrogen atom in a repeating unit is used.

According to a preferred embodiment, the repeating unit in the alkaline polymer contains an aromatic ring with at least one nitrogen atom. The aromatic ring is preferably a five-membered or six-membered ring with one to three nitrogen atoms which may be fused to another ring, in particular another aromatic ring.

According to one particular aspect of the present invention, polymers stable at high temperatures are used which contain at least one nitrogen, oxygen and/or sulphur atom in one or in different repeating units.

Within the context of the present invention, stable at high temperatures means a polymer which, as a polymeric electrolyte, can be operated over the long term in a fuel cell at temperatures above 120° C. Over the long term means that a membrane according to the invention can be operated for at least 100 hours, preferably at least 500 hours, at a temperature of at least 80° C., preferably at least 120° C., particularly preferably at least 160° C., without the performance being decreased by more than 50%, based on the initial performance which can be measured according to the method described in WO 01/18894.

The above mentioned polymers can be used individually or as a mixture (blend). Here, preference is given in particular to blends which contain polyazoles and/or polysulphones. In this context, the preferred blend components are polyethersulphone, polyether ketone and polymers modified with sulphonic acid groups, as described in WO 02/36249. By using blends, the mechanical properties can be improved and the material costs can be reduced.

Polyazoles constitute a particularly preferred group of alkaline polymers. An alkaline polymer based on polyazole contains recurring azole units of the general formula (I) and/or (II) and/or (III) and/or (IV) and/or (V) and/or (VI) and/or (VII) and/or (VIII) and/or (IX) and/or (X) and/or (XI) and/or (XII) and/or (XIII) and/or (XIV) and/or (XV) and/or (XVI) and/or (XVII) and/or (XVIII) and/or (XIX) and/or (XX) and/or (XXI) and/or (XXII)

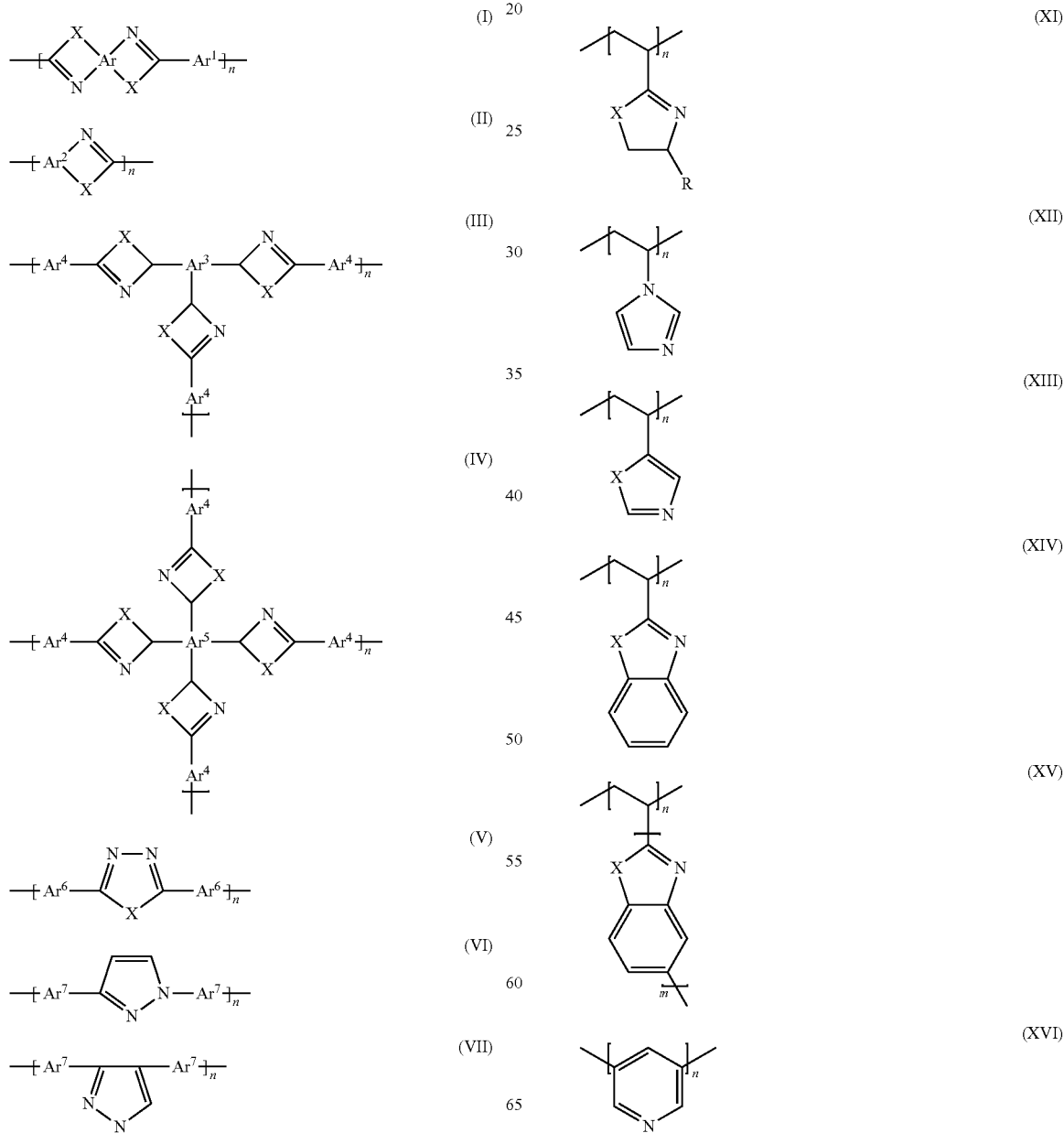

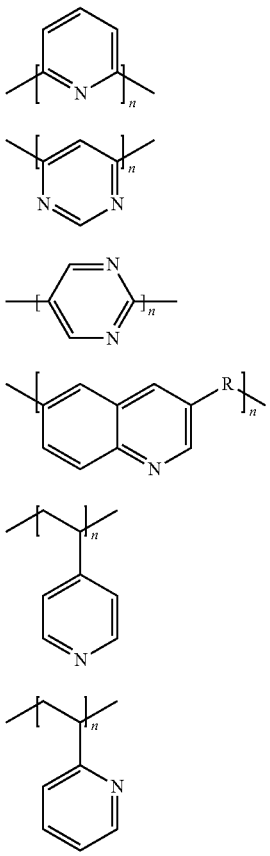

wherein

Ar are identical or different and represent a tetracovalent aromatic or heteroaromatic group which can be monocyclic or polycyclic, Ar$^1$ are identical or different and represent a bicovalent aromatic or heteroaromatic group which can be monocyclic or polycyclic, Ar$^2$ are identical or different and represent a bicovalent or tricovalent aromatic or heteroaromatic group which can be monocyclic or polycyclic, Ar$^3$ are identical or different and represent a tricovalent aromatic or heteroaromatic group which can be monocyclic or polycyclic, Ar$^4$ are identical or different and represent a tricovalent aromatic or heteroaromatic group which can be monocyclic or polycyclic, Ar$^5$ are identical or different and represent a tetracovalent aromatic or heteroaromatic group which can be monocyclic or polycyclic, Ar$^6$ are identical or different and represent a bicovalent aromatic or heteroaromatic group which can be monocyclic or polycyclic, Ar$^7$ are identical or different and represent a bicovalent aromatic or heteroaromatic group which can be monocyclic or polycyclic, Ar$^8$ are identical or different and represent a tricovalent aromatic or heteroaromatic group which can be monocyclic or polycyclic, Ar$^9$ are identical or different and represent a bicovalent or tricovalent or tetracovalent aromatic or heteroaromatic group which can be monocyclic or polycyclic, Ar$^{10}$ are identical or different and represent a bicovalent or tricovalent aromatic or heteroaromatic group which can be monocyclic or polycyclic, Ar$^{11}$ are identical or different and represent a bicovalent aromatic or heteroaromatic group which can be monocyclic or polycyclic, X are identical or different and represent oxygen, sulphur or an amino group which carries a hydrogen atom, a group having 1-20 carbon atoms, preferably a branched or unbranched alkyl or alkoxy group, or an aryl group as a further functional group, R are identical or different and represent hydrogen, an alkyl group and an aromatic group, with the proviso that R in formula (XX) is not hydrogen, and n, m are each an integer greater than or equal to 10, preferably greater than or equal to 100.

Preferred aromatic or heteroaromatic groups are derived from benzene, naphthalene, biphenyl, diphenyl ether, diphenylmethane, diphenyldimethylmethane, bisphenone, diphenylsulphone, quinoline, pyridine, bipyridine, pyridazine, pyrimidine, pyrazine, triazine, tetrazine, pyrrole, pyrazole, anthracene, benzopyrrole, benzotriazole, benzooxathiadiazole, benzooxadiazole, benzopyridine, benzopyrazine, benzopyrazidine, benzopyrimidine, benzotriazine, indolizine, quinolizine, pyridopyridine, imidazopyrimidine, pyrazinopyrimidine, carbazole, aziridine, phenazine, benzoquinoline, phenoxazine, phenothiazine, acridizine, benzopteridine, phenanthroline and phenanthrene which optionally also can be substituted.

In this case, Ar$^1$, Ar$^4$, Ar$^6$, Ar$^7$, Ar$^8$, Ar$^9$, Ar$^{10}$, Ar$^{11}$ can have any substitution pattern, in the case of phenylene, for example, Ar$^1$, Ar$^4$, Ar$^6$, Ar$^7$, Ar$^8$, Ar$^9$, Ar$^{10}$, Ar$^{11}$ can be ortho-phenylene, meta-phenylene and para-phenylene. Particularly preferred groups are derived from benzene and biphenylene which may also be substituted.

Preferred alkyl groups are short-chain alkyl groups having from 1 to 4 carbon atoms, such as, e.g., methyl, ethyl, n-propyl or i-propyl and t-butyl groups.

Preferred aromatic groups are phenyl or naphthyl groups. The alkyl groups and the aromatic groups can be substituted.

Preferred substituents are halogen atoms, such as, e.g., fluorine, amino groups, hydroxy groups or short-chain alkyl groups, such as, e.g., methyl or ethyl groups.

Preference is given to polyazoles having recurring units of the formula (I) in which the functional groups X within a recurring unit are identical.

The polyazoles can in principle also have different recurring units wherein their functional groups X are different, for example. However, there are preferably only identical functional groups X in a recurring unit.

Further preferred polyazole polymers are polyimidazoles, polybenzothiazoles, polybenzoxazoles, polyoxadiazoles, polyquinoxalines, polythiadiazoles, poly(pyridines), poly(pyrimidines) and poly(tetrazapyrenes).

In another embodiment of the present invention, the polymer containing recurring azole units is a copolymer or a blend which contains at least two units of the formulae (I) to (XXII) which differ from one another. The polymers can be in the form of block copolymers (diblock, triblock), random copolymers, periodic copolymers and/or alternating polymers.

In a particularly preferred embodiment of the present invention, the polymer containing recurring azole units is a polyazole which only contains units of the formulae (I) and/or (II).

The number of recurring azole units in the polymer is preferably an integer greater than or equal to 10. Particularly preferred polymers contain at least 100 recurring azole units.

Within the scope of the present invention, polymers containing recurring benzimidazole units are preferred. Some examples of the most useful polymers containing recurring benzimidazole units are represented by the following formulae:

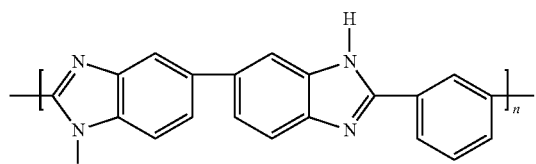
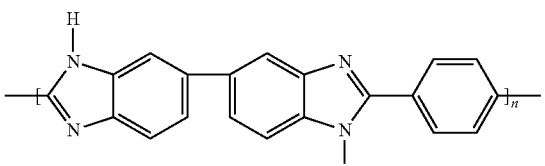
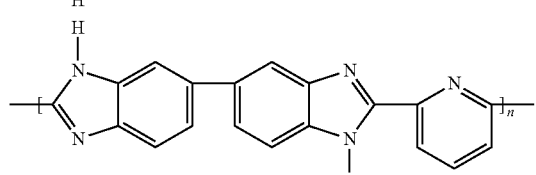
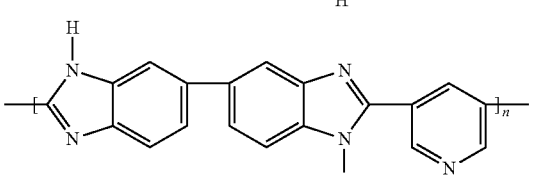
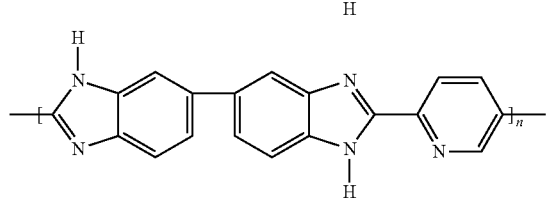
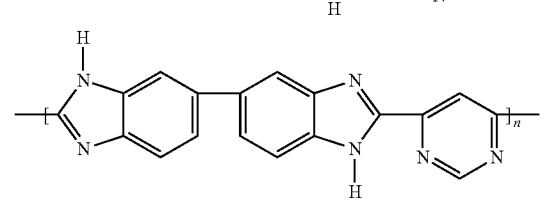
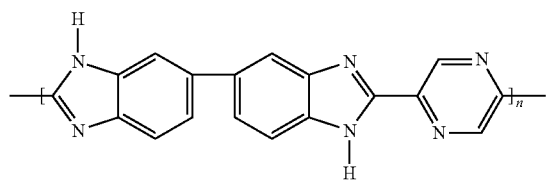
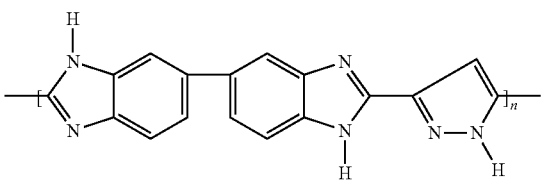
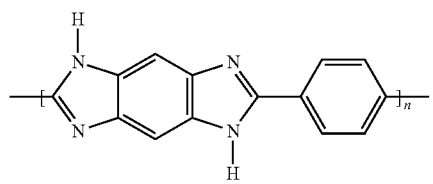
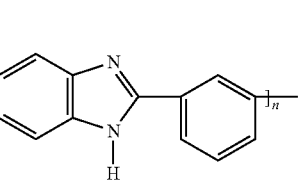
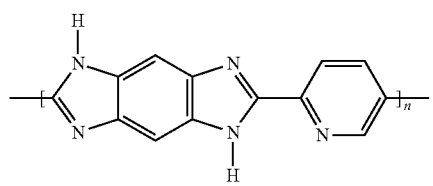
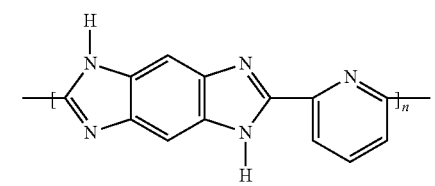
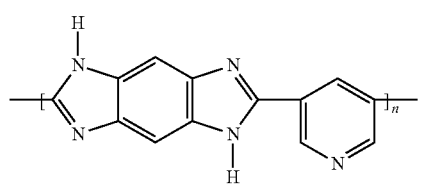
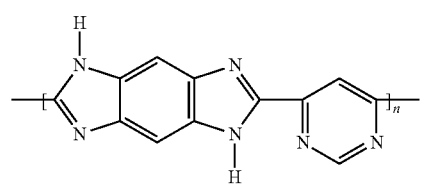
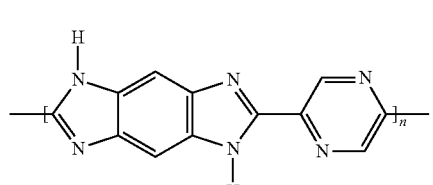
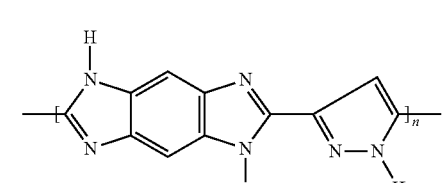
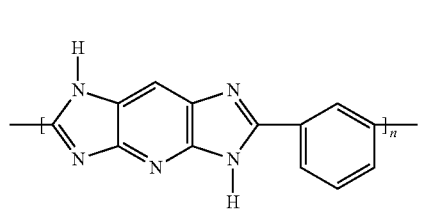
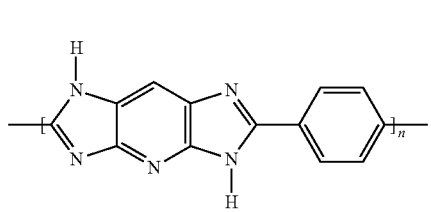

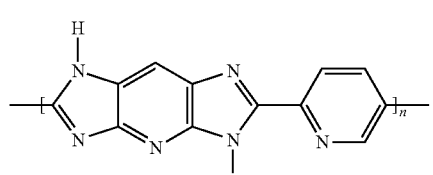
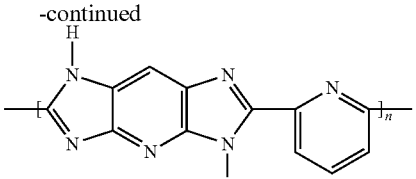
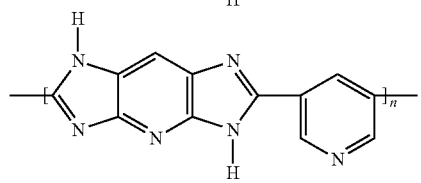
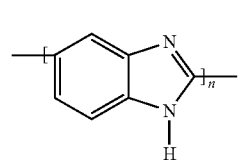
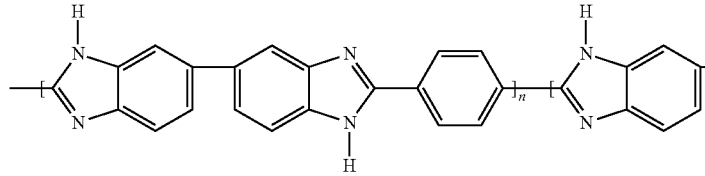
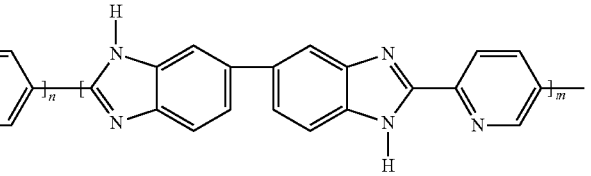
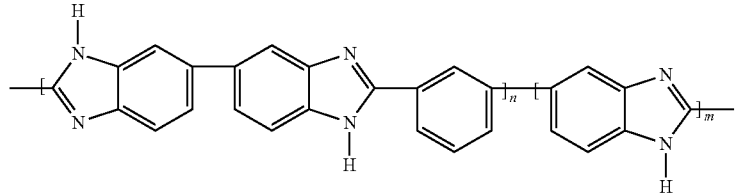

wherein n and m are each an integer greater than or equal to 10, preferably greater than or equal to 100.

The polyazoles used, in particular, however, the polybenzimidazoles are characterized by a high molecular weight. Measured as the intrinsic viscosity, this is preferably at least 0.2 dl/g, preferably 0.8 to 10 dl/g, in particular 1 to 10 dl/g.

The preparation of such polyazoles is known wherein one or more aromatic tetra-amino compounds are reacted in the melt with one or more aromatic carboxylic acids or the esters thereof, containing at least two acid groups per carboxylic acid monomer, to form a prepolymer. The resulting prepolymer solidifies in the reactor and is then comminuted mechanically. The pulverulent prepolymer is usually fully polymerised in a solid-state polymerisation at temperatures of up to 400° C.

The preferred aromatic carboxylic acids are, amongst others, dicarboxylic and tricarboxylic acids and tetracarboxylic acids or their esters or their anhydrides or their acid chlorides. The term aromatic carboxylic acids likewise also comprises heteroaromatic carboxylic acids.

Preferably, the aromatic dicarboxylic acids are isophthalic acid, terephthalic acid, phthalic acid, 5-hydroxyisophthalic acid, 4-hydroxyisophthalic acid, 2-hydroxyterephthalic acid, 5-aminoisophthalic acid, 5-N,N-dimethylaminoisophthalic acid, 5-N,N-diethylaminoisophthalic acid, 2,5-dihydroxyterephthalic acid, 2,6-dihydroxyisophthalic acid, 4,6-dihydroxyisophthalic acid, 2,3-dihydroxyphthalic acid, 2,4-dihydroxyphthalic acid, 3,4-dihydroxyphthalic acid, 3-fluorophthalic acid, 5-fluoroisophthalic acid, 2-fluoroterephthalic acid, tetrafluorophthalic acid, tetrafluoroisophthalic acid, tetrafluoroterephthalic acid, 1,4-naphthalenedicarboxylic acid, 1,5-naphthalenedicarboxylic acid, 2,6-naphthalenedicarboxylic acid, 2,7-naphthalenedicarboxylic acid, diphenic acid, 1,8-dihydroxynaphthalene-3,6-dicarboxylic acid, diphenyl ether-4,4'-dicarboxylic acid, benzophenone-4,4'-dicarboxylic acid, diphenylsulphone-4,4'-dicarboxylic acid, biphenyl-4,4'-dicarboxylic acid, 4-trifluoromethylphthalic acid, 2,2-bis-(4-carboxyphenyl) hexafluoropropane, 4,4'-stilbenedicarboxylic acid, 4-carboxycinnamic acid or their C1-C20 alkyl esters or C5-C12 aryl esters or their acid anhydrides or their acid chlorides.

The aromatic tricarboxylic acids, tetracarboxylic acids or their C1-C20 alkyl esters or C5-C12 aryl esters or their acid anhydrides or their acid chlorides are preferably 1,3,5-benzenetricarbolic acid (trimesic acid), 1,2,4-benzenetricarboxylic acid (trimellitic acid), (2-carboxyphenyl)iminodiacetic acid, 3,5,3'-biphenyltricarboxylic acid or 3,5,4'-biphenyltricarboxylic acid.

The aromatic tetracarboxylic acids or their C1-C20 alkyl esters or C5-C12 aryl esters or their acid anhydrides or their acid chlorides are preferably 3,5,3',5'-biphenyltetracarboxylic acid, 1,2,4,5-benzenetetracarboxylic acid, benzophenonetetracarboxylic acid, 3,3',4,4'-biphenyltetracarboxylic acid, 2,2',3,3'-biphenyltetracarboxylic acid, 1,2,5,6-naphthalenetetracarboxylic acid or 1,4,5,8-naphthalenetetracarboxylic acid.

The heteroaromatic carboxylic acids used are preferably heteroaromatic dicarboylic acids, tricarboxylic acids and tetracarboxylic acids or their esters or their anhydrides. Heteroaromatic carboxylic acids are understood to mean aromatic systems which contain at least one nitrogen, oxygen, sulphur or phosphorus atom in the aromatic group. These are preferably pyridine-2,5-dicarboxylic acid, pyridine-3,5-dicarboxylic acid, pyridine-2,6-dicarboxylic acid, pyridine-2,4-dicarboxylic acid, 4-phenyl-2,5-pyridinedicarboxylic acid, 3,5-pyrazoledicarboxylic acid, 2,6-pyrimidinedicarboxylic acid, 2,5-pyrazinedicarboxylic acid, 2,4,6-pyridinetricarboxylic acid or benzimidazole-5,6-dicarboxylic acid and their C1-C20 alkyl esters or C5-C12 aryl esters or their acid anhydrides or their acid chlorides.

The content of tricarboxylic acids or tetracarboxylic acids (based on dicarboxylic acid used) is between 0 and 30 mol-%, preferably 0.1 and 20 mol-%, in particular 0.5 and 10 mol-%.

The aromatic and heteroaromatic diaminocarboxylic acids used are preferably diaminobenzoic acid or its monohydrochloride and dihydrochloride derivatives.

Preferably, mixtures of at least 2 different aromatic carboxylic acids are used. Particularly preferably, mixtures are used which also contain heteroaromatic carboxylic acids in addition to aromatic carboxylic acids. The mixing ratio of aromatic carboxylic acids to heteroaromatic carboxylic acids is between 1:99 and 99:1, preferably 1:50 to 50:1.

These mixtures are in particular mixtures of N-heteroaromatic dicarboxylic acids and aromatic dicarboxylic acids. Non-limiting examples of these are isophthalic acid, terephthalic acid, phthalic acid, 2,5-dihydroxyterephthalic acid, 2,6-dihydroxyisophthalic acid, 4,6-dihydroxyisophthalic acid, 2,3-dihydroxyphthalic acid, 2,4-dihydroxyphthalic acid, 3,4-dihydroxyphthalic acid, 1,4-naphthalenedicarboxylic acid, 1,5-naphthalenedicarboxylic acid, 2,6-naphthalenedicarboxylic acid, 2,7-naphthalenedicarboxylic acid, diphenic acid, 1,8-dihydroxynaphthalene-3,6-dicarboxylic acid, diphenyl ether-4,4'-dicarboxylic acid, benzophenone-4,4'-dicarboxylic acid, diphenylsulphone-4,4'-dicarboxylic acid, biphenyl-4,4'-dicarboxylic acid, 4-trifluoromethylphthalic acid, pyridine-2,5-dicarboxylic acid, pyridine-3,5-dicarboxylic acid, pyridine-2,6-dicarboxylic acid, pyridine-2,4-dicarboxylic acid, 4-phenyl-2,5-pyridinedicarboxylic acid, 3,5-pyrazoledicarboxylic acid, 2,6-pyrimidinedicarboxylic acid, 2,5-pyrazinedicarboxylic acid.

The preferred aromatic tetramino compounds include, amongst others, 3,3',4,4'-tetraminobiphenyl, 2,3,5,6-tetraminopyridine, 1,2,4,5-tetraminobenzene, 3,3',4,4'-tetraminodiphenyl sulphone, 3,3',4,4'-tetraminodiphenyl ether, 3,3',4,4'-tetraminobenzophenone, 3,3',4,4'-tetraminodiphenylmethane and 3,3',4,4'-tetraminodiphenyldimethylmethane as well as their salts, in particular their monohydrochloride, dihydrochloride, trihydrochloride and tetrahydrochloride derivatives.

Preferred polybenzimidazoles are commercially available under the trade name 0 Celazole.

Preferred polymers include polysulphones, in particular polysulphone having aromatic and/or heteroaromatic groups in the backbone. According to a particular aspect of the present invention, preferred polysulphones and polyethersulphones have a melt volume rate MVR 300/21.6 of less than or equal to 40 cm$^3$/10 min, in particular less than or equal to 30 cm$^3$/10 min and particularly preferably less than or equal to 20 cm$^3$/10 min, measured in accordance with ISO 1133. Here, preference is given to polysulphones with a Vicat softening temperature VST/A/50 of 180° C. to 230° C. In yet another preferred embodiment of the present invention, the number average of the molecular weight of the polysulphones is greater than 30,000 g/mol.

The polymers based on polysulphone include in particular polymers having recurring units with linking sulphone groups according to the general formulae A, B, C, D, E, F and/or G:

  (A)

  (B)

  (C)

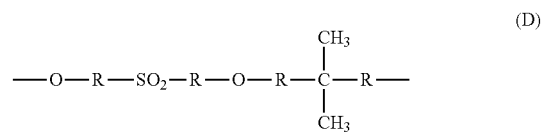  (D)

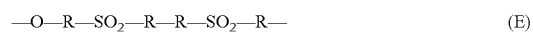  (E)

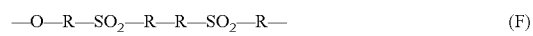  (F)

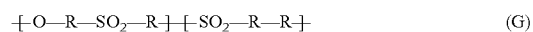  (G)

wherein the functional groups R, independently of another, are identical or different and represent aromatic or heteroaromatic groups, these functional groups having been explained in detail above. These include in particular 1,2-phenylene, 1,3-phenylene, 1,4-phenylene, 4,4'-biphenyl, pyridine, quinoline, naphthalene, phenanthrene.

The polysulphones preferred within the scope of the present invention include homopolymers and copolymers, for example random copolymers. Particularly preferred polysulphones comprise recurring units of the formulae H to N:

(H)

mit n > o (I)

(J)

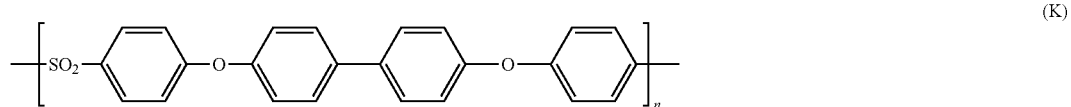

(K)

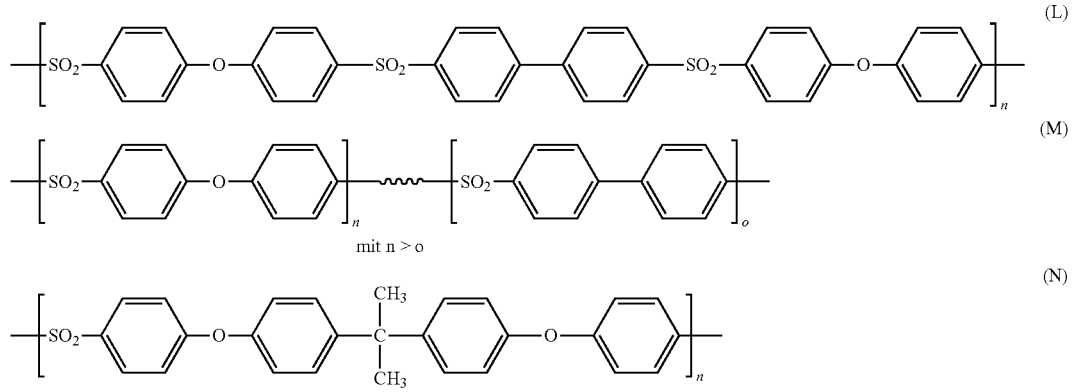

The previously described polysulphones can be obtained commercially under the trade names ®Victrex 200 P, ®Victrex 720 P, ®Ultrason E, ®Ultrason S, ®Mindel, ®Radel A, ®Radel R, ®Victrex HTA, ®Astrel and ®Udel.

Furthermore, polyether ketones, polyether ketone ketones, polyether ether ketones, polyether ether ketone ketones and polyaryl ketones are particularly preferred. These high-performance polymers are known per se and can be obtained commercially under the trade names Victrex® PEEK™, ®Hostatec, ®Kadel.

The polysulphones mentioned above and the polyether ketones, polyether ketone ketones, polyether ether ketones, polyether ether ketone ketones and polyaryl ketones mentioned can be, as already set forth, present as a blend component with alkaline polymers. Furthermore, the polysulphones mentioned above and the polyether ketones, polyether ketone ketones, polyether ether ketones, polyether ether ketone ketones and polyaryl ketones mentioned above can be used in sulphonated form as a polymer electrolyte wherein the sulphonated materials can also feature alkaline polymers, in particular polyazoles as a blend material. The embodiments shown and preferred with regard to the alkaline polymers or polyazoles also apply to these embodiments.

To produce polymer films, a polymer, preferably an alkaline polymer, in particular a polyazole can be dissolved in an additional step in polar, aprotic solvents such as dimethylacetamide (DMAc) and a film can be produced by means of classical methods.

In order to remove residues of solvents, the film thus obtained can be treated with a washing liquid, as is described in WO 02/07518. Due to the cleaning of the polyazole film to remove residues of solvent described patent application mentioned above, the mechanical properties of the film are surprisingly improved. These properties include in particular the E-modulus, the tear strength and the break strength of the film.

Additionally, the polymer film can have further modifications, for example by cross-linking, as described in WO 02/070592 or in WO 00/44816. In a preferred embodiment, the polymer film used consisting of an alkaline polymer and at least one blend component additionally contains a cross-linking agent, as described in WO 03/016384.

The thickness of the polyazole films can be within wide ranges. Preferably, the thickness of the polyazole film before its doping with acid is in the range of 5 µm to 2000 µm, particularly preferably in the range of 10 µm to 1000 µm; however, this should not constitute a limitation.

In order to achieve proton conductivity, these films are doped with an acid. In this context, acids include all known Lewis und Brønsted acids, preferably inorganic Lewis und Brønsted acids.

Furthermore, the use of polyacids is also possible, in particular isopolyacids and heteropolyacids as well as mixtures of different acids. Here, within the context of the invention, heteropolyacids define inorganic polyacids with at least two different central atoms, each formed of weak, polybasic oxygen acids of a metal (preferably Cr, MO, V, W) and a non-metal (preferably As, I, P, Se, Si, Te) as partial mixed anhydrides. These include, amongst others, the 12-phosphomolybdatic acid and the 12-phosphotungstic acid.

The conductivity of the polyazole film can be influenced via the degree of doping. The conductivity increases with an increasing concentration of the doping substance until a maximum value is reached. According to the invention, the degree of doping is given as mole of acid per mole of repeating unit of the polymer. Within the scope of the present invention, a degree of doping between 3 and 50, in particular between 5 and 40 is preferred.

Particularly preferred doping substances are sulphuric acid and phosphoric acid or compounds releasing these acids, for example during hydrolysis. A very particularly preferred doping substance is phosphoric acid ($H_3PO_4$). Here, highly concentrated acids are generally used. According to a particular aspect of the present invention, the concentration of the phosphoric acid is at least 50% by weight, in particular at least 80% by weight, based on the weight of the doping substance.

Furthermore, proton-conductive membranes can also be obtained by a method comprising the steps of
I) dissolving of polymers, particularly polyazoles in phosphoric acid,
II) heating the mixture obtainable in accordance with step A) under inert gas to temperatures of up to 400° C.,
III) forming a membrane using the solution of the polymer in accordance with step II) on a support and
IV) treating the membrane formed in step III) until it is self-supporting.

Furthermore, doped polyazole films can be obtained by a method comprising the steps of
A) mixing one or more aromatic tetramino compounds with one or more aromatic carboxylic acids or their esters, which contain at least two acid groups per carboxylic acid monomer, or mixing one or more aromatic and/or heteroaromatic diaminocarboxylic acids in polyphosphoric acid with formation of a solution and/or dispersion, B) applying a layer using the mixture in accordance with step A) to a support or to an electrode, C) heating the flat structure/layer obtainable in accordance with step B) under inert gas to temperatures of up to 350° C., preferably up to 280° C., with formation of the polyazole polymer, D) treating the membrane formed in step C) (until it is self-supporting).

The aromatic or heteroaromatic carboxylic acid and tetramino compounds to be used in step A) have been described above.

The polyphosphoric acid used in step A) is a customary polyphosphoric acid as is available, for example, from Riedel-de Haen. The polyphosphoric acids $H_{n+2}P_nO_{3n+1}$ (n>1) usually have a concentration of at least 83%, calculated as $P_2O_5$ (by acidimetry). Instead of a solution of the monomers, it is also possible to produce a dispersion/suspension.

The mixture produced in step A) has a weight ratio of polyphosphoric acid to the sum of all monomers of 1:10,000 to 10,000:1, preferably 1:1000 to 1000:1, in particular 1:100 to 100:1.

The layer formation in accordance with step B) is performed by means of measures known per se (pouring, spraying, application with a doctor blade) which are known from the prior art of polymer film production. Every support that is considered as inert under the conditions is suitable as a support. To adjust the viscosity, phosphoric acid (conc. phosphoric acid, 85%) can be added to the solution, where required. Thus, the viscosity can be adjusted to the desired value and the formation of the membrane be facilitated.

The layer produced in accordance with step B) has a thickness of 10 to 4000 μm, preferably 20 to 4000 μm, very preferably of 30 to 3500 μm, in particular of 50 to 3000 μm.

If the mixture in accordance with step A) also contains tricarboxylic acids or tetracarboxylic acid, branching/cross-linking of the formed polymer is achieved therewith. This contributes to an improvement in the mechanical property. The treatment of the polymer layer produced in accordance with step C) is performed in the presence of moisture at temperatures and for a sufficient period of time until the layer exhibits a sufficient strength for use in fuel cells. The treatment can be effected to the extent that the membrane is self-supporting so that it can be detached from the support without any damage.

In accordance with step C), the flat structure obtained in step B) is heated to a temperature of up to 350° C., preferably up to 280° C. and particularly preferably in the range of 200° C. to 250° C. The inert gases to be used in step C) are known to those in professional circles. These include in particular nitrogen as well as noble gases, such as neon, argon, helium.

In a variant of the method, the formation of oligomers and/or polymers can already be brought about by heating the mixture from step A) to temperatures of up to 350° C., preferably up to 280° C. Depending on the selected temperature and duration, it is then possible to dispense partly or fully with the heating in step C). This variant is also an object of the present invention.

The treatment of the membrane in step D) is performed at temperatures of more than 0° C. and less than 150° C., preferably at temperatures between 10° C. and 120° C., in particular between room temperature (20° C.) and 90° C., in the presence of moisture or water and/or steam and/or water-containing phosphoric acid of up to 85%. The treatment is preferably performed at normal pressure, but can also be carried out with action of pressure. It is essential that the treatment takes place in the presence of sufficient moisture whereby the polyphosphoric acid present contributes to the solidification of the membrane by means of partial hydrolysis with formation of low molecular weight polyphosphoric acid and/or phosphoric acid.

The hydrolysis fluid may be a solution wherein the fluid may also contain suspended and/or dispersed constituents. The viscosity of the hydrolysis fluid can be within wide ranges wherein an addition of solvents or an increase in temperature can take place to adjust the viscosity. The dynamic viscosity is preferably in the range of 0.1 to 10,000 mPa*s, in particular 0.2 to 2000 mPa*s, wherein these values can be measured in accordance with DIN 53015, for example.

The treatment in accordance with step D) can take place with any known method. The membrane obtained in step C) can, for example, be immersed in a fluid bath. Furthermore, the hydrolysis fluid can be sprayed onto the membrane. Additionally, the hydrolysis fluid can be poured onto the membrane. The latter methods have the advantage that the concentration of the acid in the hydrolysis fluid remains constant during the hydrolysis. However, the first method is often cheaper in practice.

The oxo acids of phosphorus and/or sulphur include in particular phosphinic acid, phosphonic acid, phosphoric acid, hypodiphosphonic acid, hypodiphosphoric acid, oligophosphoric acids, sulphurous acid, disulphurous acid and/or sulphuric acid. These acids can be used individually or as a mixture.

Furthermore, the oxo acids of phosphorus and/or sulphur comprise monomers that can be processed by free-radical polymerisation and comprise phosphonic acid and/or sulphonic acid groups.

Monomers comprising phosphonic acid groups are known in professional circles. These are compounds having at least one carbon-carbon double bond and at least one phosphonic acid group. Preferably, the two carbon atoms forming the carbon-carbon double bond have at least two, preferably 3, bonds to groups which lead to minor steric hindrance of the double bond. These groups include, amongst others, hydrogen atoms and halogen atoms, in particular fluorine atoms. Within the scope of the present invention, the polymer comprising phosphonic acid groups results from the polymerisation product which is obtained by polymerising the monomer comprising phosphonic acid groups alone or with other monomers and/or cross-linking agents.

The monomer comprising phosphonic acid groups may comprise one, two, three or more carbon-carbon double bonds. Furthermore, the monomer comprising phosphonic acid groups may contain one, two, three or more phosphonic acid groups.

In general, the monomer comprising phosphonic acid groups contains 2 to 20, preferably 2 to 10 carbon atoms.

The monomer comprising phosphonic acid groups is preferably a compound of the formula

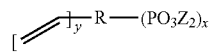

wherein

R represents a bond, a bicovalent C1-C15 alkylene group, a bicovalent C1-C15 alkyleneoxy group, for example ethyleneoxy group, or a bicovalent C5-C20 aryl or heteroaryl group wherein the above-mentioned functional groups themselves can be substituted with halogen, —OH, COOZ, —CN, NZ₂, Z represent, independently of another, hydrogen, a C1-C15 alkyl group, a C1-C15 alkoxy group, an ethyleneoxy group or a C5-C20 aryl or heteroaryl group wherein the above-mentioned functional groups themselves can be substituted with halogen, —OH, —CN, and x represents an integer 1, 2, 3, 4, 5, 6, 7, 8, 9 or 10 y represents an integer 1, 2, 3, 4, 5, 6, 7, 8, 9 or 10, and/or of the formula

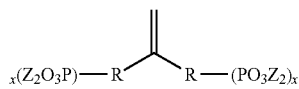

wherein

R represents a bond, a bicovalent C1-C15 alkylene group, a bicovalent C1-C15 alkyleneoxy group, for example ethyleneoxy group, or a bicovalent C5-C20 aryl or heteroaryl group wherein the above-mentioned functional groups themselves can be substituted with halogen, —OH, COOZ, —CN, NZ₂, Z represent, independently of another, hydrogen, a C1-C15 alkyl group, a C1-C15 alkoxy group, an ethyleneoxy group or a C5-C20 aryl or heteroaryl group, wherein the above-mentioned functional groups themselves can be substituted with halogen, —OH, —CN, and x represents an integer 1, 2, 3, 4, 5, 6, 7, 8, 9 or 10, and/or of the formula

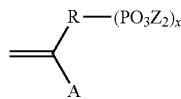

wherein

A represents a group of the formulae COOR², CN, CONR²₂, OR² and/or R²,
  wherein R² is hydrogen, a C1-C15 alkyl group, a C1-C15 alkoxy group, an ethyleneoxy group or a C5-C20 aryl or heteroaryl group, wherein the above-mentioned functional groups themselves can be substituted with halogen, —OH, COOZ, —CN, NZ₂, R represents a bond, a bicovalent C1-C15 alkylene group, a bicovalent C1-C15 alkyleneoxy group, for example ethyleneoxy group, or a bicovalent C5-C20 aryl or heteroaryl group wherein the above-mentioned functional groups themselves can be substituted with halogen, —OH, COOZ, —CN, NZ₂, Z represent, independently of another, hydrogen, a C1-C15 alkyl group, a C1-C15 alkoxy group, an ethyleneoxy group or a C5-C20 aryl or heteroaryl group, wherein the above-mentioned functional groups themselves can be substituted with halogen, —OH, —CN, and x represents an integer 1, 2, 3, 4, 5, 6, 7, 8, 9 or 10.

Preferred monomers comprising phosphonic acid groups include, inter alia, alkenes which contain phosphonic acid groups, such as ethenephosphonic acid, propenephosphonic acid, butenephosphonic acid; acrylic acid compounds and/or methacrylic acid compounds which contain phosphonic acid groups, such as for example 2-phosphonomethylacrylic acid, 2-phosphonomethylmethacrylic acid, 2-phosphonomethylacrylamide and 2-phosphonomethylmethacrylamide.

Commercially available vinylphosphonic acid (ethenephosphonic acid), such as it is available from the companies Aldrich or Clariant GmbH, for example, is particularly preferably used. A preferred vinylphosphonic acid has a purity of more than 70%, in particular 90% and particularly preferably a purity of more than 97%.

The monomers comprising phosphonic acid groups can furthermore be used in the form of derivatives which can subsequently be converted to the acid, wherein the conversion to the acid may also take place in the polymerised state. These derivatives include in particular the salts, the esters, the amides and the halides of the monomers comprising phosphonic acid groups.

Furthermore, the monomers comprising phosphonic acid groups can also be introduced onto and into the membrane after the hydrolysis. This can be performed by means of measures known per se (e.g., spraying, immersing, etc.) which are known from the prior art.

According to a particular aspect of the present invention, the ratio of the weight of the sum of phosphoric acid, polyphosphoric acid and the hydrolysis products of the polyphosphoric acid to the weight of the monomers that can be processed by free-radical polymerisation, for example the monomers comprising phosphonic acid groups, is preferably greater than or equal to 1:2, in particular greater than or equal to 1:1 and particularly preferably greater than or equal to 2:1.

Preferably, the ratio of the weight of the sum of phosphoric acid, polyphosphoric acid and the hydrolysis products of the polyphosphoric acid to the weight of the monomers that can be processed by free-radical polymerisation is in the range of 1000:1 to 3:1, in particular 100:1 to 5:1 and particularly preferably 50:1 to 10:1.

This ratio can easily be determined by means of customary methods in which, in many cases, the phosphoric acid, polyphosphoric acid and their hydrolysis products can be washed out of the membrane. Through this, the weight of the polyphosphoric acid and its hydrolysis products can be obtained after the completed hydrolysis to phosphoric acid. In general, this also applies to the monomers which can be processed by free-radical polymerisation.

Monomers comprising sulphonic acid groups are known in professional circles. These are compounds having at least one carbon-carbon double bond and at least one sulphonic acid group. Preferably, the two carbon atoms forming the carbon-carbon double bond have at least two, preferably 3, bonds to groups which lead to minor steric hindrance of the double bond. These groups include, amongst others, hydrogen atoms and halogen atoms, in particular fluorine atoms. Within the scope of the present invention, the polymer comprising sulphonic acid groups results from the polymerisation product which is obtained by polymerisation of the monomer comprising sulphonic acid groups alone or with further monomers and/or cross-linking agents.

The monomer comprising sulphonic acid groups may comprise one, two, three or more carbon-carbon double bonds. Furthermore, the monomer comprising sulphonic acid groups can contain one, two, three or more sulphonic acid groups.

In general, the monomer comprising sulphonic acid groups contains 2 to 20, preferably 2 to 10 carbon atoms.

The monomer comprising sulphonic acid groups is preferably a compound of the formula

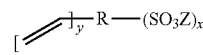

wherein

R represents a bond, a bicovalent C1-C15 alkylene group, a bicovalent C1-C15 alkyleneoxy group, for example ethyleneoxy group, or a bicovalent C5-C20 aryl or heteroaryl group, wherein the above-mentioned functional groups themselves can be substituted with halogen, —OH, COOZ, —CN, NZ$_2$, Z represent, independently of another, hydrogen, a C1-C15 alkyl group, a C1-C15 alkoxy group, an ethyleneoxy group or a C5-C20 aryl or heteroaryl group wherein the above-mentioned functional groups themselves can be substituted with halogen, —OH, —CN, and x represents an integer 1, 2, 3, 4, 5, 6, 7, 8, 9 or 10, y represents an integer 1, 2, 3, 4, 5, 6, 7, 8, 9 or 10, and/or of the formula

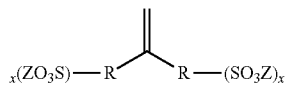

wherein

R represents a bond, a bicovalent C1-C15 alkylene group, a bicovalent C1-C15 alkyleneoxy group, for example ethyleneoxy group, or a bicovalent C5-C20 aryl or heteroaryl group, wherein the above-mentioned functional groups themselves can be substituted with halogen, —OH, COOZ, —CN, NZ$_2$, Z represent, independently of another, hydrogen, a C1-C15 alkyl group, a C1-C15 alkoxy group, an ethyleneoxy group or a C5-C20 aryl or heteroaryl group, wherein the above-mentioned functional groups themselves can be substituted with halogen, —OH, —CN, and x represents an integer 1, 2, 3, 4, 5, 6, 7, 8, 9 or 10, and/or of the formula

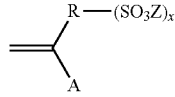

wherein

A represents a group of the formulae COOR$^2$, CN, CONR$^2{}_2$, OR$^2$ and/or R$^2$, wherein R$^2$ is hydrogen, a C1-C15 alkyl group, a C1-C15 alkoxy group, an ethyleneoxy group or a C5-C20 aryl or heteroaryl group, wherein the above-mentioned functional groups themselves can be substituted with halogen, —OH, COOZ, —CN, NZ$_2$, R represents a bond, a bicovalent C1-C15 alkylene group, a bicovalent C1-C15 alkyleneoxy group, for example ethyleneoxy group, or a bicovalent C5-C20 aryl or heteroaryl group, wherein the above-mentioned functional groups themselves can be substituted with halogen, —OH, COOZ, —CN, NZ$_2$, Z represent, independently of another, hydrogen, a C1-C15 alkyl group, a C1-C15 alkoxy group, an ethyleneoxy group or a C5-C20 aryl or heteroaryl group, wherein the above-mentioned functional groups themselves can be substituted with halogen, —OH, —CN, and x represents an integer 1, 2, 3, 4, 5, 6, 7, 8, 9 or 10.

Preferred monomers comprising sulphonic acid groups include, inter alia, alkenes which contain sulphonic acid groups, such as ethenesulphonic acid, propenesulphonic acid, butenesulphonic acid; acrylic acid compounds and/or methacrylic acid compounds which contain sulphonic acid groups, such as for example 2-sulphonomethylacrylic acid, 2-sulphonomethylmethacrylic acid, 2-sulphonomethylacrylamide and 2-sulphonomethylmethacrylamide.

Commercially available vinylsulphonic acid (ethenesulphonic acid), such as it is available from the companies Aldrich or Clariant GmbH, for example, is particularly preferably used. A preferred vinylsulphonic acid has a purity of more than 70%, in particular 90% and particularly preferably a purity of more than 97%.

The monomers comprising sulphonic acid groups can furthermore be used in the form of derivatives which can subsequently be converted to the acid, wherein the conversion to the acid may also take place in the polymerised state. These derivatives include in particular the salts, the esters, the amides and the halides of the monomers comprising sulphonic acid groups.

Furthermore, the monomers comprising sulphonic acid groups can also be introduced onto and into the membrane after the hydrolysis. This can be performed by means of measures known per se (e.g., spraying, immersing, etc.) which are known from the prior art.

In another embodiment of the invention, monomers capable of cross-linking can be used. These monomers can be added to the hydrolysis fluid. Furthermore, the monomers capable of cross-linking can also be applied to the membrane obtained after the hydrolysis.

The monomers capable of cross-linking are in particular compounds having at least 2 carbon-carbon double bonds. Preference is given to dienes, trienes, tetraenes, dimethylacrylates, trimethylacrylates, tetramethylacrylates, diacrylates, triacrylates, tetraacrylates.

Particular preference is given to dienes, trienes, tetraenes of the formula

dimethylacrylates, trimethylacrylates, tetramethylacrylates of the formula

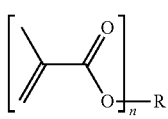

diacrylates, triacrylates, tetraacrylates of the formula

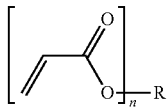

wherein

R represents a C1-C15 alkyl group, a C5-C20 aryl or heteroaryl group, NR', —SO$_2$, PR', Si(R')$_2$, wherein the above-mentioned functional groups themselves can be substituted, R' represent, independently of another, hydrogen, a C1-C15 alkyl group, a C1-C15 alkoxy group, a C5-C20 aryl or heteroaryl group, and n is at least 2.

The substituents of the above-mentioned functional group R are preferably halogen, hydroxyl, carboxy, carboxyl, carboxylester, nitriles, amines, silyl, siloxane groups.

Particularly preferred cross-linking agents are allyl methacrylate, ethylene glycol dimethacrylate, diethylene glycol dimethacrylate, triethylene glycol dimethacrylate, tetraethylene glycol dimethacrylate and polyethylene glycol dimethacrylate, 1,3-butanediol dimethacrylate, glycerol dimethacrylate, diurethane dimethacrylate, trimethylpropane trimethacrylate, epoxy acrylates, for example ebacryl, N',N-methylenebisacrylamide, carbinol, butadiene, isoprene, chloroprene, divinylbenzene and/or bisphenol A dimethylacrylate. These compounds are commercially available from Sartomer Company Exton, Pa. under the designations CN120, CN104 and CN980, for example.

The use of cross-linking agents is optional wherein these compounds can typically be used in the range of 0.05 to 30% by weight, preferably 0.1 to 20% by weight, particularly preferably 1 to 10% by weight, based on the weight of the membrane.

The cross-linking monomers can be introduced onto and into the membrane after the hydrolysis. This can be performed by means of measures known per se (e.g., spraying, immersing etc.) which are known from the prior art.

According to a particular aspect of the present invention, the monomers comprising phosphonic acid and/or sulphonic acid groups or the cross-linking monomers can be polymerised wherein the polymerisation is preferably a free-radical polymerisation. The formation of radicals can take place thermally, photochemically, chemically and/or electrochemically.

For example, a starter solution containing at least one substance capable of forming radicals can be added to the hydrolysis fluid. Furthermore, a starter solution can be applied to the membrane after the hydrolysis. This can be performed by means of measures known per se (e.g., spraying, immersing etc.) which are known from the prior art.

Suitable radical formers are, amongst others, azo compounds, peroxy compounds, persulphate compounds or azoamidines. Non-limiting examples are dibenzoyl peroxide, dicumene peroxide, cumene hydroperoxide, diisopropyl peroxydicarbonate, bis(4-t-butylcyclohexyl) peroxydicarbonate, dipotassium persulphate, ammonium peroxydisulphate, 2,2'-azobis(2-methylpropionitrile) (AIBN), 2,2'-azobis (isobutyric acid amidine)hydrochloride, benzopinacol, dibenzyl derivatives, methyl ethylene ketone peroxide, 1,1-azobiscyclohexanecarbonitrile, methyl ethyl ketone peroxide, acetyl acetone peroxide, dilauryl peroxide, didecanoyl peroxide, tert-butylper-2-ethyl hexanoate, ketone peroxide, methyl isobutyl ketone peroxide, cyclohexanone peroxide, dibenzoyl peroxide, tert-butylperoxybenzoate, tert-butylperoxyisopropylcarbonate, 2,5-bis(2-ethylhexanoylperoxy)-2,5-dimethylhexane, tert-butylperoxy-2-ethylhexanoate, tert.-butylperoxy-3,5,5-trimethylhexanoate, tert-butylperoxyisobutyrate, tert-butylperoxyacetate, dicumene peroxide, 1,1-bis(tert-butylperoxy)cyclohexane, 1,1-bis(tert-butylperoxy)-3,3,5-trimethylcyclohexane, cumyl hydroperoxide, tert-butylhydroperoxide, bis(4-tert-butylcyclohexyl) peroxydicarbonate, and the radical formers available from DuPont under the name ®Vazo, for example ®Vazo V50 and ®Vazo WS.

Furthermore, use may also be made of radical formers which form free radicals when exposed to radiation. Preferred compounds include, amongst others, α,α-diethoxyacetophenone (DEAP, Upjon Corp), n-butyl benzoin ether (®Trigonal-14, AKZO) and 2,2-dimethoxy-2-phenylacetophenone (®Igacure 651) and 1-benzoyl cyclohexanol (®Irgacure 184), bis-(2,4,6-trimethylbenzoyl)phenylphosphine oxide (®Irgacure 819) and 1-[4-(2-hydroxyethoxy)phenyl]-2-hydroxy-2-phenylpropan-1-one (®Irgacure 2959), each of which are commercially available from the company Ciba Geigy Corp.

Typically, between 0.0001 and 5% by weight, in particular 0.01 to 3% by weight (based on the weight of the monomers that can be processed by free-radical polymerisation; monomers comprising phosphonic acid groups and/or sulphonic acid groups or the cross-linking monomers, respectively) of radical formers are added. The amount of radical formers can be varied according to the degree of polymerisation desired.

The polymerisation can also take place by action of IR or NIR (IR=infrared, i.e. light having a wavelength of more than 700 nm; NIR=near-IR, i.e. light having a wavelength in the range of about 700 to 2000 nm and an energy in the range of about 0.6 to 1.75 eV), respectively.

The polymerisation can also take place by action of UV light having a wavelength of less than 400 nm. This polymerisation method is known per se and described, for example, in Hans Joerg Elias, Makromolekulare Chemie, 5th edition, volume 1, pp. 492-511; D. R. Arnold, N.C. Baird, J. R. Bolton, J. C. D. Brand, P. W. M Jacobs, P. de Mayo, W. R. Ware, Photochemistry—An Introduction, Academic Press, New York and M. K. Mishra, Radical Photopolymerization of Vinyl Monomers, J. Macromol. Sci.-Revs. Macromol. Chem. Phys. C22 (1982-1983) 409.

The polymerisation may also take place by exposure to II rays, γ rays and/or electron rays. According to a particular embodiment of the present invention, a membrane is irradiated with a radiation dose in the range of 1 to 300 kGy, preferably 3 to 200 kGy and very particularly preferably 20 to 100 kGy.

The polymerisation of the monomers comprising phosphonic acid groups and/or sulphonic acid groups or the cross-linking monomers, respectively, preferably takes place at temperatures of more than room temperature (20° C.) and less than 200° C., in particular at temperatures between 40° C. and 150° C., particularly preferably between 50° C. and 120° C. The polymerisation is preferably performed at normal pressure, but can also be carried out with action of pressure. The polymerisation leads to a solidification of the flat structure, wherein this solidification can be observed via measuring the microhardness. Preferably, the increase in hardness caused by the polymerisation is at least 20%, based on the hardness of a correspondingly hydrolysed membrane without polymerisation of the monomers.

According to a particular aspect of the present invention, the molar ratio of the molar sum of phosphoric acid, polyphosphoric acid and the hydrolysis products of polyphosphoric acid to the number of moles of the phosphonic acid groups and/or sulphonic acid groups in the polymers obtainable by polymerisation of monomers comprising phosphonic acid groups and/or monomers comprising sulphonic acid groups is preferably greater than or equal to 1:2, in particular greater than or equal to 1:1 and particularly preferably greater than or equal to 2:1.

Preferably, the molar ratio of the molar sum of phosphoric acid, polyphosphoric acid and the hydrolysis products of polyphosphoric acid to the number of moles of the phosphonic acid groups and/or sulphonic acid groups in the polymers obtainable by polymerisation of monomers comprising phosphonic acid groups and/or monomers comprising sulphonic acid groups lies in the range of 1000:1 to 3:1, in particular 100:1 to 5:1 and particularly preferably 50:1 to 10:1.

The molar ratio can be determined by means of customary methods. To this end, especially spectroscopic methods, for example, NMR spectroscopy can be used. In this connection, it has to be considered that the phosphonic acid groups are present in the formal oxidation stage 3 and the phosphorus in phosphoric acid, polyphosphoric acid or hydrolysis products thereof, respectively, in oxidation stage 5.

Depending on the degree of polymerisation desired, the flat structure which is obtained after polymerisation is a self-supporting membrane. Preferably, the degree of polymerisation is at least 2, in particular at least 5, particularly preferably at least 30 repeating units, in particular at least 50 repeating units, very particularly preferably at least 100 repeating units. This degree of polymerisation is determined via the number average of the molecular weight $M_n$, which can be determined by means of GPC methods. Due to the problems of isolating the polymers comprising phosphonic acid groups contained in the membrane without degradation, this value is determined by means of a sample which is obtained by polymerisation of monomers comprising phosphonic acid groups without addition of polymer. In this connection, the weight proportion of monomers comprising phosphonic acid groups and of radical starters in comparison to the ratios of the production of the membrane is kept constant. The conversion achieved in a comparative polymerisation is preferably greater than or equal to 20%, in particular greater than or equal to 40% and particularly preferably greater than or equal to 75%, based on the monomers comprising phosphonic acid groups used.

The hydrolysis fluid comprises water wherein the concentration of the water generally is not particularly critical.

According to a particular aspect of the present invention, the hydrolysis fluid comprises 5 to 80% by weight, preferably 8 to 70% by weight and particularly preferably 10 to 50% by weight, of water. The amount of water which is formally included in the oxo acids is not taken into account in the water content of the hydrolysis fluid.

Of the above-mentioned acids, phosphoric acid and/or sulphuric acid are particularly preferred wherein these acids comprise in particular 5 to 70% by weight, preferably 10 to 60% by weight and particularly preferably 15 to 50% by weight, of water.

The partial hydrolysis of the polyphosphoric acid in step D) leads to a solidification of the membrane due to a sol-gel transition. This is also connected with a reduction in the layer thickness to 15 to 3000 µm, preferably between 20 and 2000 µm, in particular between 20 and 1500 µm; the membrane is self-supporting. The intramolecular and intermolecular structures (interpenetrating networks IPN) present in the polyphosphoric acid layer in accordance with step B) lead to an ordered membrane formation in step C), which is responsible for the particular properties of the membrane formed.

The upper temperature limit for the treatment in accordance with step D) is typically 150° C. With extremely short action of moisture, for example from overheated steam, this steam can also be hotter than 150° C. The duration of the treatment is substantial for the upper limit of the temperature.

The partial hydrolysis (step D) can also take place in climatic chambers where the hydrolysis can be specifically controlled with defined moisture action. In this connection, the moisture can be specifically set via the temperature or saturation of the surrounding area in contact with it, for example gases such as air, nitrogen, carbon dioxide or other suitable gases, or steam. The duration of the treatment depends on the parameters chosen as aforesaid.

Furthermore, the duration of the treatment depends on the membrane thicknesses.

Typically, the duration of the treatment amounts to between a few seconds to minutes, for example with the action of overheated steam, or up to whole days, for example in the open air at room temperature and low relative humidity. Preferably, the duration of the treatment is between 10 seconds and 300 hours, in particular 1 minute to 200 hours.

If the partial hydrolysis is performed at room temperature (20° C.) with ambient air having a relative humidity of 40-80%, the duration of the treatment is between 1 and 200 hours.

The membrane obtained in accordance with step D) can be formed in such a way that it is self-supporting, i.e. it can be detached from the support without any damage and then directly processed further, if applicable.

The concentration of phosphoric acid and therefore the conductivity of the polymer membrane can be set via the degree of hydrolysis, i.e. the duration, temperature and ambient humidity. The concentration of the phosphoric acid is given as mole of acid per mole of repeating unit of the polymer. Membranes with a particularly high concentration of phosphoric acid can be obtained by the method comprising the steps A) to D). A concentration (mol of phosphoric acid, based on a repeating unit of formula (I), for example polybenzimidazole) of 10 to 50, in particular between 12 and 40 is preferred. Only with very much difficulty or not at all is it possible to obtain such high degrees of doping (concentrations) by doping polyazoles with commercially available orthophosphoric acid.

According to a modification of the method described wherein doped polyazole films are produced by use of polyphosphoric acid, the production of these films can be carried out by a method comprising the following steps:

1) reacting one or more aromatic tetramino compounds with one or more aromatic carboxylic acids or their esters, which contain at least two acid groups per carboxylic acid monomer, or one or more aromatic and/or heteroaromatic diaminocarboxylic acids in the melt at temperatures of up to 350° C., preferably up to 300° C.,
2) dissolving the solid prepolymer obtained in accordance with step 1) in polyphosphoric acid,
3) heating the solution obtainable in accordance with step 2) under inert gas to temperatures of up to 300° C., preferably up to 280° C., with formation of the dissolved polyazole polymer,
4) forming a membrane using the solution of the polyazole polymer in accordance with step 3) on a support and
5) treating the membrane formed in step 4) until it is self-supporting.

The steps of the method described under items 1) to 5) have been explained before in detail for the steps A) to D), where reference is made thereto, in particular with regard to preferred embodiments.

A membrane, particularly a membrane based on polyazoles, can further be cross-linked at the surface by action of heat in the presence of atmospheric oxygen. This hardening of the membrane surface further improves the properties of the membrane. To this end, the membrane can be heated to a temperature of at least 150° C., preferably at least 200° C. and particularly preferably at least 250° C. In this step of the method, the oxygen concentration usually is in the range of 5 to 50% by volume, preferably 10 to 40% by volume; however, this should not constitute a limitation.

The cross-linking can also take place by action of IR or NIR (IR=infrared, i.e. light having a wavelength of more than 700 nm; NIR=near-IR, i.e. light having a wavelength in the range of from about 700 to 2000 nm and an energy in the range of from about 0.6 to 1.75 eV), respectively. Another method is R-ray irradiation. In this connection, the irradiation dose is from 5 to 200 kGy.

Depending on the degree of cross-linking desired, the duration of the cross-linking reaction can be within a wide range. In general, this reaction time lies in the range of 1 second to 10 hours, preferably 1 minute to 1 hour; however, this should not constitute a limitation.

Particularly preferred polymer membranes display a high performance. The reason for this is in particular improved proton conductivity. This is at least 1 mS/cm, preferably at least 2 mS/cm, in particular at least 5 mS/cm at temperatures of 120° C. Here, these values are achieved without moistening.

The specific conductivity is measured by means of impedance spectroscopy in a 4-pole arrangement in potentiostatic mode and using platinum electrodes (wire, diameter of 0.25 mm). The gap between the current-collecting electrodes is 2 cm. The spectrum obtained is evaluated using a simple model comprised of a parallel arrangement of an ohmic resistance and a capacitor. The cross section of the sample of the membrane doped with phosphoric acid is measured immediately prior to mounting of the sample. To measure the temperature dependency, the measurement cell is brought to the desired temperature in an oven and regulated using a Pt-100 thermocouple arranged in the immediate vicinity of the sample. Once the temperature is reached, the sample is held at this temperature for 10 minutes prior to the start of measurement.

Gas Diffusion Layer

The membrane electrode assembly produced by the method according to the invention has two gas diffusion layers which are separated by the polymer electrolyte membrane.

Mechanically stabilizing materials which are very light, not necessarily electrically conductive, but mechanically stable and contain fibres, for example, in the form of non-woven fabrics, paper or woven fabrics are used as the starting material for the gas diffusion layers according to the invention. These include, for example, graphite-fibre paper, carbon-fibre paper, graphite fabric and/or paper which was rendered conductive by addition of carbon black. Through these layers, a fine distribution of the flows of gas and/or liquid is achieved.

The mechanically stabilizing material preferably contains carbon fibres, glass fibres or fibres containing organic polymers, for example polypropylene, polyester (polyethylene terephthalate), polyphenylenesulphide or polyether ketones, to name only a few. In this connection, materials with a weight per unit area <150 g/m$^2$, preferably with a weight per unit area in the range of 10 to 100 g/m$^2$ are particularly well suited.

When using carbon materials as stabilizing materials, non-woven fabrics made of carbonised or graphitised fibres with weights per unit area within the preferred range are particularly suited. Using such materials has two advantages: Firstly, they are very light and secondly, they have a high open porosity. The open porosity of the stabilizing materials used with preference is within the range of 20 to 99.9%, preferably 40 to 99%, such that they can easily be filled with other materials and the porosity, conductivity and hydrophobicity of the finished gas diffusion layer thus can be adjusted in a directed manner, namely throughout the entire thickness of the gas diffusion layer.

Generally, this layer has a thickness in the range of 80 μm to 2000 μm, in particular 100 μm to 1000 μm and particularly preferably 150 μm to 500 μm.

The production of gas diffusion layers or gas diffusion electrodes is described in detail in WO 97/20358, for example. The production methods set out therein are also part of the present description.

To reduce the surface tension, materials (additives or detergents) can be added, such as described in detail in WO 97/20358. Additionally, the hydrophobicity of the gas diffusion layer can be set by using perfluorinated polymers together with non-fluorinated binders. Subsequently, the equipped gas diffusion layers are dried and after-treated thermally, for example by sintering at temperatures of more than 200° C.

Furthermore, it is possible to construct the gas diffusion layer with several layers. In a preferred embodiment of the gas diffusion layer, it has at least 2 distinguishable layers. 4 layers are considered as an upper limit for multi-layered gas diffusion layers. If more than one layer is used, it is convenient to form an intimate connection of these layers with each other by means of a compression or lamination step, preferably at a higher temperature. By using multi-layered gas diffusion layers, it is possible to produce pre-trimmed layers, by means of which gradients of effective porosity and/or hydrophobicity can be set. Such gradients can also be generated by several successive coating or impregnating steps which, however, is typically more elaborate to implement.

According to a particular embodiment, at least one of the gas diffusion layers can consist of a compressible material. Within the scope of the present invention, a compressible material is characterized by the property that the gas diffusion layer can be compressed to half, in particular a third of its original thickness without losing its integrity.

The gas diffusion layers according to the invention have a low electrical surface resistivity which is in the range of <100 mOhm per cm$^2$, preferably <60 mOhm per cm$^2$.

This property is generally exhibited by a gas diffusion layer made of graphite fabric and/or graphite paper which were rendered conductive by addition of carbon black. The gas diffusion layers are usually also optimised in respect of their hydrophobicity and mass transfer properties by the addition of further materials. In this connection, the gas diffusion layers are equipped with fluorinated or partially fluorinated materials, for example PTFE.

Catalyst Layer

The catalyst layer or catalyst layers, either being present on the membrane or the polymer electrolyte membrane, contains or contain catalytically active substances. These include, amongst others, precious metals of the platinum group, i.e. Pt, Pd, Ir, Rh, Os, Ru, or also the precious metals Au and Ag. Furthermore, alloys of all the above-mentioned metals may also be used. Additionally, at least one catalyst layer can contain alloys of the elements of the platinum group with non-precious metals, such as for example Fe, Co, Ni, Cr, Mn, Zr, Ti, Ga, V, etc. Furthermore, the oxides of the above-mentioned precious metals and/or non-precious metals can also be used.

The catalytically active particles which comprise the above-mentioned substances can be used as metal powder, in particular platinum and/or platinum alloy powder, so-called black precious metal. Such particles generally have a size in the range of 5 nm to 200 nm, preferably in the range of 7 nm to 100 nm. So-called nano particles are also used.

Furthermore, the metals can also be used on a support material. Preferably, this support comprises carbon which particularly may be used in the form of carbon black, graphite or graphitised carbon black. Furthermore, electrically conductive metal oxides, such as for example, $SnO_x$, $TiO_x$, or phosphates, such as e.g. $FePO_x$, $NbPO_x$, $Zr_y(PO_x)_z$, can be used as support material. In this connection, the indices x, y and z designate the oxygen or metal content of the individual compounds which can lie within a known range as the transition metals can be in different oxidation stages.

The content of these metal particles on a support, based on the total weight of the bond of metal and support, is generally in the range of 1 to 80% by weight, preferably 5 to 60% by weight and particularly preferably 10 to 50% by weight; however, this should not constitute a limitation. The particle size of the support, in particular the size of the carbon particles, is preferably in the range of 20 to 1000 nm, in particular 30 to 100 nm. The size of the metal particles present thereon is preferably in the range of 1 to 20 nm, in particular 1 to 10 nm and particularly preferably 2 to 6 nm.

The sizes of the different particles represent mean values and can be determined via transmission electron microscopy or X-ray powder diffractometry.

The catalytically active particles set forth above can generally be obtained commercially.

Besides the catalysts or catalyst particles already commercially available, catalyst nano particles made of platinum-containing alloys, in particular based on Pt, Co and Cu or Pt, Ni and Cu, respectively, can also be used in which the particles in the outer shell have a higher Pt content as in the core. Such particles were described by P. Strasser et al. in Angewandte Chemie 2007.

Furthermore, the catalytically active layer may contain customary additives. These include, amongst others, fluoropolymers, such as e.g. polytetrafluoroethylene (PTFE), proton-conducting ionomers and surface-active substances.

According to a particular embodiment of the present invention, the weight ratio of fluoropolymer to catalyst material comprising at least one noble metal and optionally one or more support materials is greater than 0.1, this ratio preferably lying within the range of 0.2 to 0.6.

According to a particular embodiment of the present invention, the catalyst layer has a thickness in the range of 1 to 1000 µm, in particular from 5 to 500, preferably from 10 to 300 µm. This value represents a mean value, which can be determined by using cross-section images of the layer that can be obtained with a scanning electron microscope (SEM).

According to a particular embodiment of the present invention, the content of noble metals of the catalyst layer is 0.1 to 10.0 mg/cm$^2$, preferably 0.3 to 6.0 mg/cm$^2$ and particularly preferably 0.3 to 3.0 mg/cm$^2$. These values can be determined by elemental analysis of a flat sample.

The catalyst layer is in general not self-supporting but is usually applied to the gas diffusion layer and/or the membrane. In this connection, a part of the catalyst layer can, for example, diffuse into the gas diffusion layer and/or the membrane, resulting in the formation of transition layers. This can also lead to the catalyst layer being understood as part of the gas diffusion layer. The thickness of the catalyst layer results from measuring the thickness of the layer onto which the catalyst layer was applied, for example the gas diffusion layer or the membrane, the measurement providing the sum of the catalyst layer and the corresponding layer, for example the sum of the gas diffusion layer and the catalyst layer. The catalyst layers preferably feature gradients, i.e. the content of precious metals increases in the direction of the membrane while the content of hydrophobic materials is behaving contrarily.

For further information on membrane electrode assemblies, reference is made to the technical literature, in particular the patent applications WO 01/18894 A2, DE 195 09 748, DE 195 09 749, WO 00/26982, WO 92/15121 and DE 197 57 492. The disclosure contained in the above-mentioned references with respect to the structure and production of membrane electrode assemblies as well as the electrodes, gas diffusion layers and catalysts to be chosen is also part of the description.

Electrode

If the above-mentioned gas diffusion layers are provided with a catalyst layer on the side facing the polymer electrolyte membrane or electrolyte matrix, this is also referred to as electrode.

Coating of the gas diffusion layers with the catalyst material is performed by known measures, in particular as described in detail in WO 97/20358. The production methods set out therein are also part of the present description.

Subgaskets

The subgaskets used within the scope of the method according to the invention are provided as films.

In this connection, it is essential that the subgasket (i) in the constructional inner boundary area overlaps inwards and thus overlaps the outer boundary area of the gas diffusion layer or the gas diffusion layer provided with a catalyst layer and (ii) in the constructional inner boundary area overlaps inwards and thus overlaps the outer boundary area of the proton-conducting polymer electrolyte membrane/matrix, either coated or uncoated with a catalyst layer, Through this overlap of the subgasket, a gas-tight sealing is achieved.

Furthermore, it is advantageous if the subgasket possesses a sufficient mechanical stability and/or integrity such that in a subsequent compression step, for example, the gas diffusion layer and/or the membrane/electrolyte matrix will not be damaged. To this end, a so-called hard stop function may be integrated into the subgasket in an advantageous manner. This embodiment is particularly preferred when the subgasket is used together with a bipolar plate without a raised edge.

Preferably, the subgaskets according to the invention are formed from meltable polymers or rubbers which can be processed thermally.

Among the rubbers, silicone rubber (Q), ethylene-propylene-diene rubber (EPDM), ethylene-propylene rubber (EPM), isobutylene-isoprene rubber (IIR), butadiene rubber (BR), styrene-butadiene rubber (SBR), styrene-isoprene rubber (SIR), isoprene-butadiene rubber (IBR), isoprene rubber (IR), acrylonitrile-butadiene rubber (NBR), chloroprene rubber (CR), acrylate rubber (ACM) and/or partially hydrogenated rubber from butadiene rubber (BR), styrene-butadiene rubber (SBR), isoprene-butadiene rubber (IBR), isoprene rubber (IR), acrylonitrile-butadiene rubber (NBR), polyisobutylene rubber (PIB), fluoro rubber (FPM), fluoro-silicone rubber (MFQ, FVMQ) are preferred.

Furthermore, fluoropolymers are used as sealing material, preferably poly(tetrafluoroethylene-co-hexafluoropropylene) FEP, polyvinylidene fluoride PVDF, perfluoroalkoxy polymer PFA and poly(tetrafluoroethylene-co-perfluoro (methylvinyl ether) MFA. These polymers are commercially available in many ways—for example under the trade names Hostafon®, Hyflon®, Teflon®, Dyneon® and Nowoflon®.

Apart from the materials mentioned above, sealing materials based on polyimides can also be used. The class of polymers based on polyimides also includes polymers also containing, besides imide groups, amide (polyamideimides), ester (polyesterimides) and ether groups (polyetherimides) as components of the backbone.

Preferred polyimides have recurring units of the formula

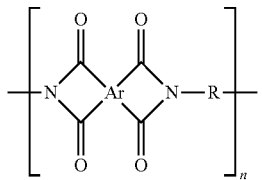

wherein the functional group Ar has the meaning set forth above and the functional group R represents an alkyl group or a bicovalent aromatic or heteroaromatic group with 1 to 40 carbon atoms. Preferably, the functional group R represents a bicovalent aromatic or heteroaromatic group derived from benzene, naphthalene, biphenyl, diphenyl ether, diphenyl ketone, diphenylmethane, diphenyldimethylmethane, bisphenone, diphenylsulphone, quinoline, pyridine, bipyridine, anthracene, thiadiazole and phenanthrene which optionally also can be substituted. The index n suggests that the recurring units represent parts of polymers.

Such polymers are commercially available under the trade names ®Kapton, ®Vespel, ®Toray and ®Pyralin from DuPont as well as ®Ultem from GE Plastics and ®Upilex from Ube Industries.

Combinations of the above-mentioned materials with the property combination soft/hard are also suitable as sealing material, in particular when the above-mentioned hard stop function is to be integrated.

Particularly preferred sealing materials have a Shore A hardness of 5 to 85, in particular of 25 to 80. The Shore hardness is determined according to DIN 53505. Furthermore, it is advantageous when the permanent set of the sealing material is lower than 50%. The permanent set is determined according to DIN ISO 815.

The thickness of the subgaskets is influenced by several factors. An essential factor is how high the elevation in the boundary area of the bipolar plate is chosen. Usually, the thickness of the subgasket generated or applied is 5 µm to 5000 µm, preferably 10 µm to 1000 µm and in particular 25 µm to 150 µm. In particular in the case of bipolar plates without a raised boundary area, the thickness can also be higher.

The subgaskets can also be constructed with several layers. In this embodiment, different layers are connected with each other using suitable polymers, in particular fluoropolymers being well suited to establish an adequate connection. Suitable fluoropolymers are known to those in professional circles. These include, amongst others, polytetrafluoroethylene (PTFE) and poly(tetrafluoroethylene-co-hexafluoropropylene) (FEP). The layer made of fluoropolymers present on the sealing layers described above in general has a thickness of at least 0.5 µm, in particular at least 2.5 µm. If expanded fluoropolymers are applied, the thickness of the layer can be 5 to 250 µm, preferably 10 to 150 µm.

The subgaskets described above, advantageously, overlaps the outer boundary area of the gas diffusion layer/membrane circumferentially. The overlap of the subgasket with the boundary area is preferably 0.1 to 5 mm, preferably 0.1 to 3 mm, based on the outermost edge of the gas diffusion layer/membrane. A greater overlap is possible, but leads to a strong loss in catalytically active surface. For this reason, the degree of overlapping has to be balanced in a critical way so that an unnecessarily excessive part of the catalytically active surface is covered.

DETAILED DESCRIPTION OF THE METHOD

In step a) of the instant invention, a gas diffusion layer or a gas diffusion layer which has at least one catalyst layer on that side facing upwards (electrode) is supplied and deposited on top of an anvil. The anvil is a precision machined anvil that is bolted through a compliant (or non-compliant) support to a machine base. The anvil will be described in more detail later on.

In step b) of the instant invention, a proton-conducting polymer electrolyte membrane or electrolyte matrix is supplied and deposited on the surface of the gas diffusion layer having a catalyst layer facing upwardly. In case the proton-conducting polymer electrolyte membrane or electrolyte matrix is coated with a catalyst layer, the catalyst coated side of the membrane or matrix is deposited on the gas diffusion layer in such a way that the catalyst coated side faces towards the gas diffusion layer.

To such extent a subgasket is needed, such subgasket material will be supplied and deposited before placing the proton-conducting polymer electrolyte membrane or electrolyte matrix.

In a preferred embodiment, when using proton-conducting polymer electrolyte membrane or electrolyte matrix comprising non-covalently bonded acid groups, in particular when alkaline polymer membranes comprising an acid are used, it is beneficial to provide such proton-conducting polymer electrolyte membrane or electrolyte matrix on a removable carrier film for improved handling. Prior to placing the second gas diffusion layer in step c) such carrier film will be removed. Suitable carrier films as described in US 2004/0096734.

In step c) of the instant invention, a gas diffusion layer (in case the proton-conducting polymer electrolyte membrane/electrolyte matrix is catalyst coated) or a gas diffusion layer which has at least one catalyst layer on that side facing towards the proton-conducting polymer electrolyte membrane/electrolyte matrix is supplied and deposited on the proton-conducting polymer electrolyte membrane or electrolyte matrix.

In step d) of the instant invention, the compression of the components obtained in accordance with steps a), b) and c) up to a presettable pressure or up to a presettable compression is performed. When using a proton-conducting polymer electrolyte membrane or electrolyte matrix comprising non-covalently bonded acid groups, in particular when alkaline polymer membranes comprising an acid are used, it is beneficial to choose a presettable compression.

This "presettable compression" method can be carried out with customary presses known to those skilled in the art, e.g., in such a way that one or more shims are placed between the pressure plates. The height of the shims thereby corresponds to the presettable compression. With a given initial thickness D of the membrane electrode unit before the compressing and a wanted compression of X %, the height H of the shims is H=D*(100−X)/100.

Alternatively, the pressing method "presettable compression" can be carried out path-controlled. There, the pressure plates are moved towards each other with the help of an electronic control unit and a hydraulic or mechanical traversing unit that they have the space H to each other, as calculated above. Such methods are known to those skilled in the art, however, and therefore do not need further explanation.

A further particular embodiment is characterised in that the "presettable compression" value is selected in the interval from incl. 1 to 60%. A preferred interval comprises the values from 10 to 60%, particularly from 15 to 40%, most preferred from 15 to 25%. This preferred interval is particularly advantageous for membranes comprising alkaline polymers doped with mineral acids. The compression herein is calculated as the quotient of the final thickness of the resulting compound and the sum of the initial thicknesses of the individual elements, multiplied by 100 in order to obtain the unit "%".

A further particular embodiment of the "presettable compression" is characterised in that the compressing until a presettable compression is achieved is carried out within a period from 1 to 100 seconds. Preferably, the compression which can be set is reached within a period of 20 seconds, more preferably within 10 seconds. The moment when the pressure plates exert pressure on the MEUs defines the beginning of the time interval. The pressure plates can then be held in this state for a further preselectable period in order to be driven apart and to release the blank afterwards. This further preselectable period may extend from 10 to 100 seconds, preferably from 15 to 50 seconds, especially preferably approx. 30 seconds. These values depend on the hardness of the selected membrane.

A further particular embodiment of the "presettable compression" is characterised in that the compressing is carried out at a compression speed in the range of 0.2 to 2%/s, at a maximum, however, of 20%/s. Measured in absolute speed of the pressure plates, a preferred maximum "compression speed" amounts to 0.2 millimeter per second with a typical MEA thickness of approx. 1 mm. At higher speeds the membranes risk to be damaged by crushing and shearing. Preferred absolute compression speeds lie in the range of 1 to 200 µm/s. With a typical MEA thickness of approx. 1 mm, compression speeds of 20 to 200 µm/s are particularly advantageous. A further particular embodiment is characterized in that the compressing is carried out in ramps.

Traditional thermal pressing of low temperature MEAs which use polymer electrolyte membranes comprising acids which are covalently bound to the polymer, such as Nation® based membrane, result in MEA systems having a thickness of about 750-800 microns. Such systems typically use 15-25%, preferably 20% compression, and compression rates of an order of 2% per second. The thermal pressing cycle times is about 2-5 minutes per MEA.

The method of the instant invention uses the same compression parameters for such low temperature systems, however, the ultrasonic bonding allows for much higher compression rates of 5% to 10% per second, and a total pressing time of 1 to 5 seconds per MEA.

As described above, during or subsequently after the compression, while all components are still in the compressed state, additionally ultrasonic waves are used for bonding the proton-conducting polymer electrolyte membrane/electrolyte matrix to the gas diffusion layers.

The ultrasonic waves used in connection with the instant invention preferably have a vertical oscillation between 10 and 50 µm in amplitude at a frequency of 15-20 kHz. By choosing such ultrasonic waves bonding at the material interfaces takes place in a few seconds as compared to the conventional heated tooling on a hydraulic press with a cycle time of about a minute.

In a preferred embodiment of the invention, the ultrasonic wave supported compression employs a transducer frequency of either 15 KHz or 20 KHz, which produces a vibration amplitude of the ultrasonic waves of about 20 µm for the 20 KHz system and about 30 µm for the 15 KHz system. While ultrasonic frequencies of up to 70 KHz are available, and may be used successfully, the higher the frequency the smaller the size of the MEA that may be produced.

We use a booster, typically a mechanical amplifier, in line with the transducer, with an amplification ranging from 0.6× to 1.5× and 2.5×, thus the resulting amplitude of vibration of the surface of the horn can vary from about 12 µm to about 75 µm, depending on the combination of transducer and booster that is used. Hence, the preferred range of the ultrasonic waves used in the compression step d) have a vibration amplitude of the ultrasonic waves of about 10 µm to 75 µm.

The preferred combination for compressing MEAs up to 200 mm×200 mm in size is a 20 KHz transducer with a 1.5× booster, although other combinations may also produce acceptable results. For MEAs up to 300 mm×300 mm the preferred combination is a 15 KHz transducer and 1.0 booster, although other combinations may also produce acceptable results.

Either pulsed wave or continuous wave vibration will work, although continuous wave is the preferred method.

The pressure, which is the combination of pressure and energy used in the compression, is dependent on the specific materials being used. For high temperature polymer electrolyte membrane based MEAs, which are those polymer electrolyte membranes which comprise at least one polymer and at least one non-covalently bonded acid, a pressure ranging from $0.2/mm^2$ to $1.0$ $N/mm^2$, preferably $0.22$ $N/mm^2$ to $0.88$ $N/mm^2$, is used in step d)

For low temperature polymer electrolyte membrane based MEAs, which are those polymer electrolyte membranes which comprise at least one polymer having at least one covalently bonded acid, such as sulfonic acid groups, a pressure ranging from $2.0$ $N/mm^2$ to $5.0$ $N/mm^2$, preferably $2.2$ $N/mm^2$ to $4.5$ $N/mm^2$, is used in step d).

Preferably, the energy flux used in the compression step d) is from $0.1$ $J/mm^2$ to $1.5$ $J/mm^2$, most preferred from $0.15$ $J/mm^2$ to $1.2$ $J/mm^2$. However, the energy flux is dependent on the specific materials being used.

Preferably, the energy flux used for high temperature PEM MEAs varies from $0.2$ $J/mm^2$ to $1.2$ $J/mm^2$, most preferred from $0.25$ $J/mm^2$ to $1.0$ $J/mm^2$.

Preferably, the energy flux used for low temperature PEM MEAs varies from $0.5$ $J/mm^2$ to $0.7$ $J/mm^2$.

These ranges of combinations of energy flux and pressures result in ultrasonic pressing cycle times ranging from about 300 ms to 3 sec, depending on the specific materials being used.

The parameters for the compression step d) can be customized, to the components used in the MEA assembly, e.g. when using different gas diffusion layer base materials, e.g. paper vs. cloth, and membrane thickness, and solids/acid content of the membranes.

The use of ultrasonics in step d) is not intuitively obvious, nor a simple use of existing techniques used in traditional plastic welding (the dominate use of ultrasonic welding). Traditional ultrasonic welding is most often used for joining similar thermoplastic materials through melting of those materials. In the instant invention, very dissimilar materials are joined consisting of a porous gas diffusion layer, such as a carbon cloth or carbon paper and proton conductive membranes, such as a sol-gel membrane consisting primarily of phosphoric acid and a small percentage of polymer or a Nafion® film.

The instant method does not melt the materials to be bonded together, in fact, the instant inventions carefully controls the process to raise the interfacial temperature in a controlled manner to less than the melt point or the sintering point of critical materials. If melting or sintering temperatures would be reached, e.g. the Platinum in the catalyst layer would be adversely impacted causing less performance of the resulting MEA.

The ultrasonic wave bonding process of the instant invention has many advantages over conventional bonding methods as the latter utilizes heated tooling in a hydraulic press (in the range of 40-100 tons) with cycle times on the order of a minute. Some of the advantages of the ultrasonic bonding of MEA's include:

Improves process cycle times by an order of magnitude;
Reduces energy consumption by more than an order of magnitude;
Reduces capital expenditures for bonding equipment;
Improves control of the acid migration into the catalyst and gas diffusion layers on the electrodes when using a proton-conducting polymer electrolyte membrane or electrolyte matrix comprising non-covalently bonded acid groups, in particular when alkaline polymer membranes comprising an acid are used;
Reduces potential damage to the assembly components as the heat affected areas are concentrated at the interfaces of the compressible components and not throughout the entire stack of components.
Lower pressures and shorter pressing times are required during the bonding process, resulting in less acid loss in the MEA when using a proton-conducting polymer electrolyte membrane or electrolyte matrix comprising non-covalently bonded acid groups, in particular when alkaline polymer membranes comprising an acid are used;
The reduction in cycle time, energy consumption, and capital expenditure potentially decreases the overall MEA costs
The reduced acid loss and improved control of acid migration results in improved performance of the MEA, when proton-conducting polymer electrolyte membrane or electrolyte matrix comprising non-covalently bonded acid groups, in particular when alkaline polymer membranes comprising an acid, are used.

As mentioned before, when proton-conducting polymer electrolyte membrane or electrolyte matrix comprising non-covalently bonded acid groups, in particular when alkaline polymer membranes comprising an acid, are used, the method according to the instant invention allows to control the acid movement and improve the performance of the MEAs, the ultrasonic bonding process parameters of energy flux Input, applied pressure during the ultrasonic bonding process, velocity and amplitude of the ultrasonic energy wave, and the application cycle time are controlled. These parameters directly relate to the temperature at the Interface of the materials allowing for successful ultrasonic bonding of MEAs and control the acid movement into the catalyst layer and gas diffusion layer (GDL) of the MEAs.

FIG. 1 illustrates the apparatus setup used by the method according to the invention. The vertically vibrating horn applying the energy (Ultrasonic waves) to an MEA placed on a precision machined anvil that is bolted through a compliant (or non-compliant) support to the machine base.

Preferably, the horn and/or anvil for the ultrasonic bonding process are knurled for improved performance. In particular, the ultrasonic horn and anvil are manufactured with male or female knurls on the surface touching the materials to be ultrasonically bonded.

The knurling of the horn, anvil, or both creates a more efficient energy transfer to the materials to be bonded. The knurled surfaces assist in maintaining proper registration between layers of the MEA during the ultrasonic bonding process by reducing the movement of the material being bonded. The cavities in the knurled surface(s) are less constraining that smooth tooling, and provide space for the MEA materials to move during the vibration of the tooling. This makes the bonding process more efficient.

Thus, it is preferred to have knurl pattern on either the horn or the anvil or on both the horn and anvil. Most preferred are female knurl patterns. Further it is preferred if such female knurl pattern is fine, this having a female knurl pattern of about 1 mm×1.5 mm pitch, and approximately 0.25 mm deep.

Alternatively, the horn, anvil, or both can have a smooth surface which is less efficient in the energy transfer to the materials being bonded and does not maintain registration of the materials being bonded as the materials will move unless restrained in another method such as external frames or fixturing. However, the inventive concept can still be used.

The ultrasonic anvil support, which is between the anvil and the machine base, is compliant over a wide range. Such compliant support allows for better alignment of the anvil and horn and control of the actual thickness of the MEA components during the ultrasonic bonding process, in particular when some variation in the thickness of the MEA components occur. Further, the compliant support will assist in maintaining a more uniform pressure on the MEA components during ultrasonic bonding as the compliance in the support can adjust for misalignment in the horn and anvil to the geometrical variations in the MEA components. This also assists to prevent movement of the materials being bonded.

In this context it is important that a compliant anvil support reduces the likelihood of damage to the MEA materials being assembled.

The range of Durometer (Shore A) of the compliant anvil support material is on the range of 60 to 90, which corresponds to a stiffness (MPa) of from 10 to 20,000 (for urethane to polycarbonate to steel). Polycarbonate is the preferred compliant anvil support material, as the urethane properties vary significantly with temperature and age.

Instead of the ultrasonic anvil support or in addition to the ultrasonic anvil support, a compliant anvil can be used.

The addition of a compliant anvil (made of a material such as silicone rubber of various stiffness, or polycarbonate) on the machine base the alignment of the anvil and horn to the actual thickness of the MEA components during the ultrasonic bonding process is improved with accounting for some variation in the thickness of the MEA components. Further, the compliant anvil will maintain a more even pressure on the MEA components during ultrasonic bonding as the compliance in the anvil adjusts for misalignment in the horn and anvil to the variations in the MEA components.

Instead of using the compliant anvil, a rigid horn to anvil alignment is achieved with mechanical adjustment of the machine base during setup of the equipment and is not adjusted during the production run and does not account for mechanical misalignment during the setup or for variation in the component materials. However, the inventive concept can still be used.

In a further embodiment of the invention, barrier materials are used during the ultrasonic bonding process to protect the tooling. This is of particular importance when proton-conducting polymer electrolyte membrane or electrolyte matrix comprising non-covalently bonded acid groups, in particular when alkaline polymer membranes comprising an acid, are used, because leakage of any such acid may damage the tooling. The use of such barrier materials further protects the horn/anvil from build-up of materials such as carbon from the electrodes/gas diffusion layers. Typically, the barrier materials are made of a non-thermal plastic material with a large stiffness differential from the materials being bonded so as to transfer the ultrasonic energy to the materials being bonded and are made of a material that does not adhere to the materials being bonded (such as the PTFE and FEP from the MEA subgasket). The barrier material can be indexed in a roll to roll system to keep clean barrier material in contact with the tolling and MEA in the production process.

For practical reasons, the most preferred barrier material is uncoated Kapton® available from DuPont.

Alternatively, the tooling would require cleaning after a few compression/bonding cycles. However, the inventive concept can still be used.

Within the aforementioned range of Durometer (Shore A) of the compliant anvil support material being in the range of 60 to 90, which corresponds to a stiffness (MPa) of from 10 to 20,000, polymer materials, such as thermoplastic polymer materials can be used. A particular preference is given to thermoplastic polyester materials, such as polycarbonates, which are the most preferred compliant anvil support materials.

Suitable compliant materials include, but are not limited too, unsaturated rubbers, such as polyisoprene, cis-1,4-polyisoprene natural rubber (NR) and trans-1,4-polyisoprene gutta-percha, synthetic polyisoprene (IR for Isoprene Rubber), polybutadiene (BR for Butadiene Rubber), chloroprene rubber (CR), polychloroprene, butyl rubber (copolymer of isobutylene and isoprene, IIR), halogenated butyl rubbers (chloro butyl rubber: CIIR; bromo butyl rubber: BIIR), styrene-butadiene rubber (copolymer of styrene and butadiene, SBR), nitrile rubber (copolymer of butadiene and acrylonitrile, NBR), hydrogenated nitrile rubbers (HNBR), saturated rubbers, such as EPM (ethylene propylene rubber, a copolymer of ethylene and propylene) and EPDM rubber (ethylene propylene diene rubber, a terpolymer of ethylene, propylene and a diene-component), Epichlorohydrin rubber (ECO), Polyacrylic rubber (ACM, ABR), Silicone rubber (SI, Q, VMQ), Fluorosilicone Rubber (FVMQ), Fluoroelastomers (FKM, and FEPM), Perfluoroelastomers (FFKM), Polyether block amides (PEBA), Chlorosulfonated polyethylene (CSM), Ethylene-vinyl acetate (EVA) and other thermoplastic elastomers (TPE).

Depending on the nature of the proton-conducting polymer electrolyte membrane or electrolyte matrix used, a so-called "hard stop" function can be included. This is of particular importance when proton-conducting polymer electrolyte membrane or electrolyte matrix comprising non-covalently bonded acid groups, in particular when alkaline polymer membranes comprising an acid, are used. These hard stops control the minimum thickness of compressed MEA.

The addition of "hard stops" limits the movement of the base and anvil in relation to the horn and allows for the setting of a minimum thickness to which the MEA can be compressed during the ultrasonic bonding process. The hard stops will limit the stroke of the cylinder under the base of the machine, and thus limit the movement of the anvil bolted to the base, in order to limit the potential minimum thickness of the MEA after bonding.

Instead of the aforementioned "hard stops" the minimum thickness of the MEA can also be controlled by a servo controlled hard stops function. The addition of servo controlled hard stops will adjust the movement of the base and anvil in relation to the horn and allows for adjusting and setting of a minimum thickness to which the MEA can be compressed during the ultrasonic bonding process. The servo controlled hard stops will limit the stroke of the cylinder under the base of the machine, and thus limit the movement of the anvil bolted to the base, in order to limit the potential minimum thickness of the MEA after bonding. The servo control can implement in-line feedback of the thickness of the incoming MEA components and adjust the location of the hard stops accordingly.

In a further embodiment of the invention, it is preferred to provide a coolant flowing, preferably a liquid coolant, through the anvil to maintain the anvil temperature merely constant during ultrasonic bonding of the MEA components. The active cooling of the anvil maintains more constant parameters for the temperature and energy of the bonding process as well as dimensional stability of the anvil. In addition, such cooling allows faster cycle times in the bonding step, because of the heat generated by the ultrasonic bonding.

In a further embodiment of the invention, it is preferred to provide an active cooling, preferably by a liquid coolant, of the compliant support material, either alone or in combination with the active cooling of the anvil. The active cooling of the compliant support material allows to maintain the temperature of the compliant support material in a manufacturing production process by flowing temperature controlled coolant through a heat sink that actively controls the temperature of the support material in order to maintain the temperature and the compliance of the support material during the repeated process of ultrasonically bonding. Such actively controlled cooling of the compliant support material will maintain a more even pressure an the MEA components during ultrasonic bonding as the compliance in the support material that adjusts for misalignment in the horn and anvil to the MEA components that can be maintained as the increased temperature of the support material during the ultrasonic bonding process will be controlled by the active cooling. This feature will also increase the service life of the support material. However, the inventive concept can still be used without such cooling.

In particular the cooling of the compliant support material maintains the mechanical properties of the support material constant, thereby reducing the variability of the bonding process parameters, and resulting in more uniform dimensional and performance properties of the MEAs.

In the instant invention, so-called horns are used as ultrasonic wave source. The ultrasonic waves are generated using state of the art equipment. The instant process can be performed by using large vertical vibrating horns or rotating sonotrodes instead of the horns. The horns/rotating sonotrodes used by the instant invention typically have an active surface of up to 250 mm×250 mm.

However, the maximum size of the ultrasonic horn is a function of the frequency of the vibrations, and is determined by how much variation in amplitude of vibration of the surface of the horn. It is desired to have as little variation in vibration amplitude as possible in order to maintain a uniform energy flux over the surface of the MEA materials. As the size of the horn increases typically there is a reduction of amplitude noticed in the corners of the horn surface. For a 15 KHz system the maximum allowable horn dimension is approximately 300 mm, with less than a 10% variation in vibration amplitude and the corresponding variation in energy flux over the surface of the horn.

The use of a large horn can apply the ultrasonic energy over a larger are in one application or, through the use of rotating sonotrode, the application of the ultrasonics can be achieved an a more continuous material movement system. By implementing larger horns or rotating sonotrodes, the manufacturing cycle time may be able to be improved upon over the use of the smaller horns.

However, even smaller ultrasonic horns can be used to apply the ultrasonic energy, e.g. by scanning the area to be bonded by ultrasonic waves. Therefore, the inventive concept is not specifically bound to the use of small or large horns or to the use of rotating sonotrode. Each of these sources for ultrasonic waves can be used to practice the instant invention. For practical reasons, larger horns or rotating sonnotrodes results in improved manufacturing cycle times and energy savings.

The membrane-electrode assemblies (MEA) obtained using the method of the instant invention can be distinguished from those manufactured in the traditional way, e.g. by microscopy. Further, such membrane-electrode assemblies, in particular those using high temperature polymer electrolyte membranes, which are those polymer electrolyte membranes which comprise at least one polymer and at least one non-covalently bonded acid, preferably the polymer is based on an alkaline polymer, have improved performance over those MEA which do not employ ultrasonic waves during compression.

Typically, the cell resistance of those high temperature MEA's is from 100 to 120 mOhm/cm2 and for those manufactured in accordance with the instant invention the cell resistance BOL (beginning of life) is 120 mOhm/cm$^2$ and EOL (end of life) is 130 mOhm/cm$^2$. This about 8% increase shows that the interface membrane/catalyst layer/gas diffusion layer is still intact.

The cell internal resistance was measured using a milliohmmeter at 1000 Hz (Agilent 4338B) and primarily represents the protonic resistance of the membrane.

Figure 2:
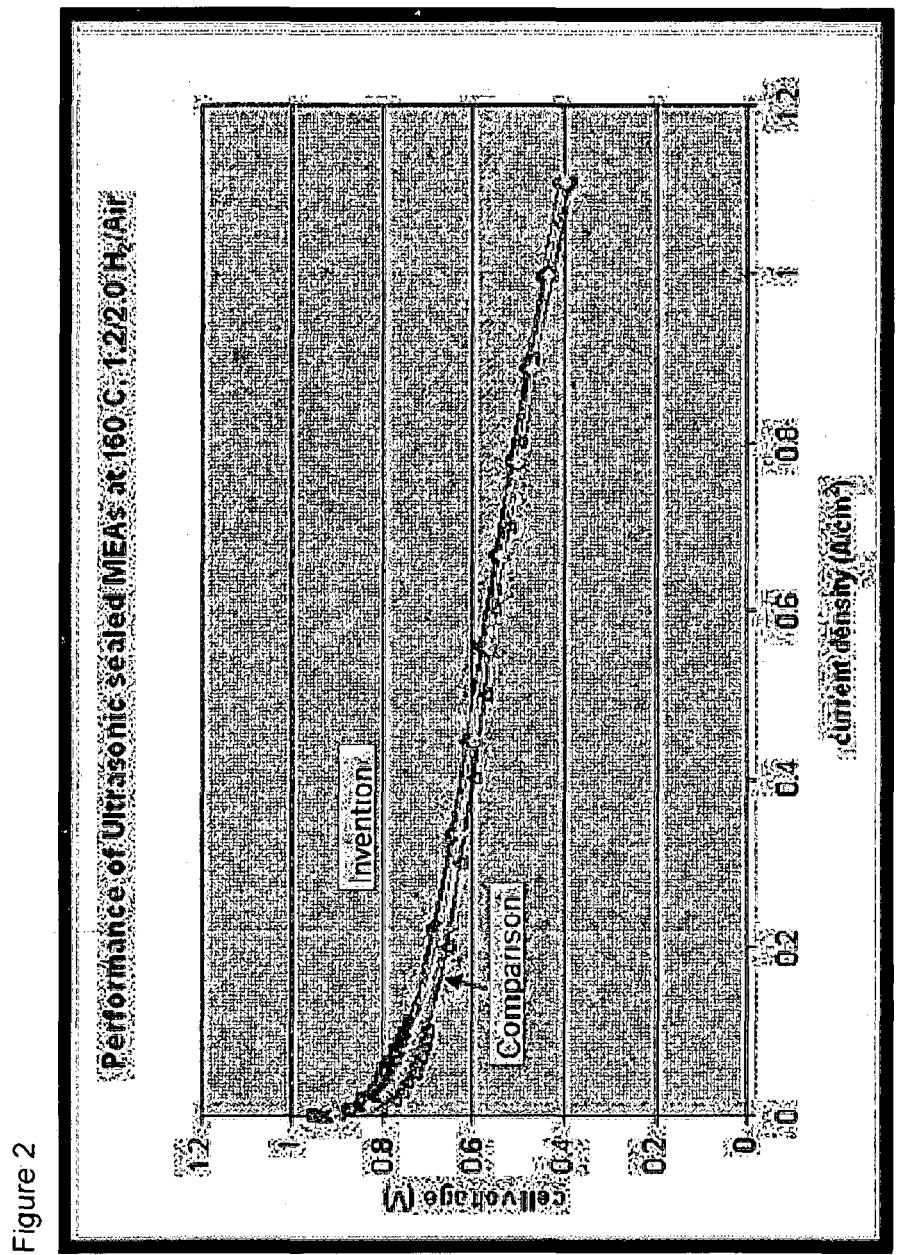
FIG. 2 shows the performance of an MEA manufactured in accordance with the instant invention vs. the same type of MEA not bonded with ultrasonic wave support.

In addition, the performance of the MEA obtained using the method of the instant invention is improved as displayed in FIG. 2.

The instant invention can further be combined with further process steps, in particular when the assembling described in steps a) to c) is performed separately. In such alternative process, the assembled, non-laminated, sandwiched structures will be placed on the anvil for compression and bonding in step d). However, such assembled, non-laminated, sandwiched structures can variegate in thickness, temperature and other means, such as compressibility of the gas diffusion layers and/or polymer electrolyte membranes or acid content, in particular when proton-conducting polymer electrolyte membrane or electrolyte matrix comprising non-covalently bonded acid groups, in particular when alkaline polymer membranes comprising an acid, are used. Therefore, the incoming assembled, non-laminated, sandwiched structures can be measured, e.g. in thickness, for further processing or to adjust the settings of the ultrasonic bonding process to a different presetting, e.g. when the porosity of the gas diffusion layers, or the acid content and concentration in the membrane is different. By this it is possible to optimize the resulting bonded MEA and/or the acid concentration/migration.

The detailed description of the objects according to the invention is set out above and the respectively preferred embodiments can be freely combined with each other to avoid unnecessary repetitions.

When the word "about" is used herein it is meant that the amount or condition it modifies can vary some beyond that stated so long as the advantages of the invention are realized. Practically, there is rarely the time or resources available to very precisely determine the limits of all the parameters of one's invention because to do so would require an effort far greater than can be justified at the time the invention is being developed to a commercial reality. The skilled artisan understands this and expects that the disclosed results of the invention might extend, at least somewhat, beyond one or more of the limits disclosed. Later, having the benefit of the inventors' disclosure and understanding the inventive concept and embodiments disclosed including the best mode known to the inventor, the inventor and others can, without inventive effort, explore beyond the limits disclosed to determine if the invention is realized beyond those limits and, when embodiments are found to be without any unexpected characteristics, those embodiments are within the meaning of the term "about" as used herein. It is not difficult for the artisan or others to determine whether such an embodiment is either as expected or, because of either a break in the continuity of results or one or more features that are significantly better than reported by the inventor, is surprising and thus an unobvious teaching leading to a further advance in the art.

Different embodiments employing the concept and teachings of the invention will be apparent and obvious to those of ordinary skill in this art and these embodiments are likewise intended to be within the scope of the claims. The inventor does not intend to abandon any disclosed inventions that are reasonably disclosed but do not appear to be literally claimed below, but rather intends those embodiments to be included in the broad claims either literally or as equivalents to the embodiments that are literally included.

The present invention will be explained in more detail below on the basis of some examples, without this being intended to represent any limitation.

In this connection:

FIG. 1 shows the ultrasonic tooling used in connection with the method of the invention and the MEA materials used for compressing and bonding.

FIG. 2 shows the performance of an MEA manufactured in accordance with the instant invention vs. the same type of MEA not bonded with ultrasonic wave support.

FIG. 1 shows the horn and anvil between which the individual MEA components are arranged for compression and ultrasonic wave supported bonding. The anvil and/or horn can have the aforementioned knurled surfaces and sizes. The anvil is bolted through a compliant or non-compliant support material to the machine base. The MEA components can be placed individually and may further include the aforementioned subgaskets (not shown) or the MEA components can be placed as assembled, non-laminated sandwich to be compressed and bonded.

FIG. 2 shows the fuel cell performance of ultrasonically bonded MEA (high temperature MEA having a polyazole/acid based membrane tested at 160 C. The gases were supplied with no external humidification at 1.2/2.0 stoich H$_2$/Air.

Example

MEAs were fabricated with Celtec®-P 1000 series (available form BASF Fuel Cell) membranes made of polybenzimidazole (PBI) polymer saturated with phosphoric acid (PA), ranging from 300 to 540 µm in thickness. The phosphoric acid is responsible for proton conduction, while the PBI polymer provides structural integrity to the membrane. The acid content in the membrane is about 90%, which makes the membrane very pliable. The PBI-PA membranes exhibit conductivity values in the range of 0.15-0.2 S/cm at 160 C.

The electrodes, both anode and cathode, also BASF Fuel Cell products from the HT141-W series, consisted of a woven carbon fabric gas diffusion layer (GDL), a micro porous layer and a catalyst layer and the active area of the MEAs was 45.15 cm$^2$. The catalyst is 30% Pt on Vulcan XC-72 with a Pt loading of about 1 g/m$^2$ on both the anode and cathode with an average thickness of the electrodes of about 400 µm.

The individual components are placed in the desired order, such as placing the cathode electrode (optionally having a gasket) on the anvil, then centering a membrane on the electrode, followed by another anode electrode (optionally having a gasket) on top, and finally the ultrasonic horn vertically moving downward on top of the stacked components.

The horn applies the vibrational energy (Branson ultrasonic system) through the top electrode to both interfaces on each side of the membrane.

The process parameters that are controlled through the Branson ultrasonic system include the energy applied to the MEA, the sealing pressure applied by the pneumatic cylinder prior to the application of the sealing energy flux, and the vibration amplitude booster used to multiply the normal system amplitude of 20 µm (for the Branson 2000× system).

The stiffness of the anvil backer is also controllable by placing (or not placing) a piece of material under the stainless steel anvil that contacts the lower electrode of the MEA in the sealing process

| Variables | Values | |
|---|---|---|
| | High | Low |
| Energy Flux (J/mm$^2$) | 0.6 | 0.4 |
| Sealing Pressure (N/mm$^2$) | 0.88 | 0.44 |
| Amplitude Booster | 2.5x | 1.5x |
| Anvil Support Backer Stiffness | steel | 90 A Durometer |

Durability testing of an ultrasonically sealed MEA was performed.

A typical polarization curve created for MEAs manufactured using ultrasonic wave support during compression is shown in FIG. 2 accompanied by the polarization curve of the same type of MEAs not using ultrasonic bonding.

The invention claimed is:

1. A method for the production of an individual electrochemical cell, wherein said electrochemical cell comprises
  (i) at least one proton-conducting polymer electrolyte membrane matrix that includes an acid which is not covalently bonded to the polymer,
  (ii) at least one electrically conductive gas diffusion layer on each side of the proton-conducting polymer electrolyte membrane matrix,
  (iii) at least one catalyst layer arranged
    (a) on both sides of the proton-conducting polymer electrolyte membrane matrix or
    (b) on each side of the electrically conductive gas diffusion layers facing towards the proton-conducting polymer electrolyte membrane matrix, and
  (iv) optionally a first subgasket film frame which overlaps (a) the outer peripheral area of the electrically conductive gas diffusion layer and (b) the outer peripheral area of the proton-conducting polymer electrolyte membrane matrix on the anode side and a second subgasket film frame which overlaps (a) the outer peripheral area of the electrically conductive gas diffusion layer and (b) the outer peripheral area of the proton-conducting polymer electrolyte membrane matrix on the cathode side, said first subgasket film frame and said second subgasket film frame extending beyond the proton-conducting polymer electrolyte membrane matrix and beyond the electrically conductive gas diffusion layers, said first subgasket film frame and said second subgasket film frame further being in flat contact with each other, said method comprising:
  a) supplying and depositing:
    (i) a gas diffusion layer or
    (ii) a gas diffusion layer which has at least one catalyst layer on that side facing upwards
  and depositing the gas diffusion layer on an anvil, and
  b) supplying and depositing:
    (i) a proton-conducting polymer electrolyte membrane matrix on the surface of the gas diffusion layer having a catalyst layer facing upward or
    (ii) a catalyst coated proton-conducting polymer electrolyte membrane matrix on the surface of the gas diffusion layer, the catalyst coated side of the membrane matrix facing towards the gas diffusion layer, and
  c) supplying and depositing:
    (i) a second gas diffusion layer if the proton-conducting polymer electrolyte membrane matrix is catalyst coated or
    (ii) a second gas diffusion layer which has at least one catalyst layer on that side facing towards the proton-conducting polymer electrolyte membrane matrix, and
  d) compressing the components obtained in accordance with step a), b) and c) up to a preset pressure or up to a preset compression, and
  bonding the proton-conducting polymer electrolyte membrane matrix to the gas diffusion layers during the compression in step d) or subsequently after the compression while the components are still in the compressed state, with ultrasonic waves having an energy flux from 0.1 J/mm$^2$ to 1.5 J/mm2 to heat the gas diffusion layers, and the proton-conducting polymer electrolyte membrane matrix, to an interfacial temperature of less than the melting point of the layers and the electrolyte membrane matrix.

2. The method of claim 1, wherein the individual electrochemical cell is an individual membrane electrode assembly for use in fuel cells.

3. The method of claim 1, wherein the compression in step d) no additional heating is performed in step d) other than the heat provided by the ultrasonic waves.

4. The method of claim 1, wherein the gas diffusion layer is coated with a catalyst layer.

5. The method of claim 1, wherein the proton-conducting polymer electrolyte membrane matrix is coated with a catalyst layer.

6. The method of claim 1, wherein the first subgasket film frame is provided between step a) and step b) and the second subgasket film frame is provided between step b) and step c).

7. The method of claim 1, wherein the assembling described in steps a) to c) is performed separately and on any surface not limited to an anvil and the assembled, non-laminated, layered structure is placed on the anvil for compression and bonding in step d).

8. A method for the production of an individual electrochemical cell, wherein said electrochemical cell comprises
(i) at least one proton-conducting polymer electrolyte membrane that includes acid groups which are covalently bonded to a polymer,
(ii) at least one electrically conductive gas diffusion layer on each side of the proton-conducting polymer electrolyte membrane,
(iii) at least one catalyst layer arranged
  (a) on both sides of the proton-conducting polymer electrolyte membrane or
  (b) on each side of the electrically conductive gas diffusion layers facing towards the proton-conducting polymer electrolyte membrane, and
(iv) optionally a first subgasket film frame which overlaps (a) the outer peripheral area of the electrically conductive gas diffusion layer and (b) the outer peripheral area of the proton-conducting polymer electrolyte membrane on the anode side and a second subgasket film frame which overlaps (a) the outer peripheral area of the electrically conductive gas diffusion layer and (b) the outer peripheral area of the proton-conducting polymer electrolyte membrane on the cathode side, said first subgasket film frame and said second subgasket film frame extending beyond the proton-conducting polymer electrolyte membrane and beyond the electrically conductive gas diffusion layers, said first subgasket film frame and said second subgasket film frame further being in flat contact with each other,
said method comprising:
a) supplying and depositing:
  (i) a gas diffusion layer or
  (ii) a gas diffusion layer which has at least one catalyst layer on that side facing upwards
  and depositing the gas diffusion layer on an anvil, and
b) supplying and depositing:
  (i) a proton-conducting polymer electrolyte membrane on the surface of the gas diffusion layer having a catalyst layer facing upward or
  (ii) a catalyst coated proton-conducting polymer electrolyte membrane on the surface of the gas diffusion layer, the catalyst coated side of the membrane facing towards the gas diffusion layer, and
c) supplying and depositing:
  (i) a second gas diffusion layer if the proton-conducting polymer electrolyte membrane is catalyst coated or
  (ii) a second gas diffusion layer which has at least one catalyst layer on that side facing towards the proton-conducting polymer electrolyte membrane, and
d) compressing the components obtained in accordance with step a), b) and c) up to a preset pressure or up to a preset compression, and
bonding the proton-conducting polymer electrolyte membrane to the gas diffusion layers during the compression in step d) or subsequently after the compression while the components are still in the compressed state, with ultrasonic waves having an energy flux from $0.5$ J/mm$^2$ to $0.7$ J/mm2 to heat the gas diffusion layers, and the proton-conducting polymer electrolyte membrane, to an interfacial temperature of less than the melting point of the layers and the electrolyte membrane.

9. The method of claim 8, wherein the polymer electrolyte membrane comprises fluorinated or perfluorinated polymer having covalently bonded sulphonic acid and/or phosphonic acid groups.

10. The method of claim 1, wherein the polymer electrolyte membrane comprises an alkaline polymer.

11. The method of claim 10, wherein the alkaline polymer contains at least one nitrogen atom in a repeating unit of the polymer.

12. The method of claim 1, wherein the preset compression is from 10 to 60%.

13. The method of claim 1, wherein the preset compression in step d) is achieved by using one or more shims placed between pressure plates, or by path-control of pressure plates.

14. The method of claim 1, wherein the ultrasonic waves have a vertical oscillation between 10 and 75 microns in amplitude, and a frequency of 15-20 kHz.

15. The method of claim 1, wherein the preset pressure or preset compression used in step d) for polymer electrolyte membrane comprising an alkaline polymer is from $0.2$/mm$^2$ to $1.0$ N/mm$^2$.

16. The method of claim 8, wherein the preset pressure or preset compression used in step d) for polymer electrolyte membrane comprising fluorinated or perfluorinated polymer having covalently bonded sulphonic acid and/or phosphonic acid groups is from $2.0$ N/mm$^2$ to $5.0$ N/mm$^2$.

17. The method of claim 1, wherein the energy flux is from $0.2$ J/mm$^2$ to $1.2$ J/mm$^2$.

18. The method of claim 1, wherein the ultrasonic waves are applied by a horn.

19. The method of claim 15, wherein the ultrasonic bonding process includes use of a horn and/or anvil with a knurled surface.

20. The method of claim 19, wherein the horn and the anvil have female knurls on the surface.

21. The method of claim 19, wherein the anvil has a support which is located between the anvil and a machine base, said support being compliant.

22. The method of claim 19, wherein the anvil is actively cooled by a coolant.

23. The method of claim 21, wherein the support is actively cooled by a coolant.

24. The method of claim 1, wherein the preset compression includes a compression speed of 20 to 200 μm/s for a membrane electrode assembly with a thickness of 1 mm.

25. The method of claim 1, wherein the acid is an inorganic Lewis or Bronsted acid.

26. The method of claim 1, wherein the acid is selected from phosphoric acid, polyphosphoric acid or mixtures thereof.

27. The method of claim 6, wherein the first and the second subgasket film frame is a fluoropolymer selected from poly(tetrafluoroethylene-co-hexafluoropropylene) FEP, polyvinylidine fluoride PVDF, perfluoroalkoxy polymer PFA, or poly(tetrafluoroethylene-co-perfluoro(methylvinyl ether) MFA.

28. The method of claim 6, wherein the first and the second subgasket film frame is a polyimide.

* * * * *